(12) United States Patent
Raghavan et al.

(10) Patent No.: US 8,787,430 B2
(45) Date of Patent: *Jul. 22, 2014

(54) LOW COMPLEXITY HIGH-SPEED COMMUNICATIONS TRANSCEIVER

(75) Inventors: Sreen Raghavan, La Jolla, CA (US); Thulasinath G. Manickam, San Diego, CA (US); Peter J. Sallaway, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 1255 days.

This patent is subject to a terminal disclaimer.

(21) Appl. No.: 12/558,781

(22) Filed: Sep. 14, 2009

(65) Prior Publication Data

US 2010/0002795 A1 Jan. 7, 2010

Related U.S. Application Data

(63) Continuation of application No. 09/965,242, filed on Sep. 26, 2001, now Pat. No. 7,590,168, which is a continuation of application No. 09/904,432, filed on Jul. 11, 2001, now Pat. No. 7,295,623.

(51) Int. Cl.
 H04B 1/38 (2006.01)
 H04L 5/16 (2006.01)

(52) U.S. Cl.
 USPC .......................................... 375/219; 375/265

(58) Field of Classification Search
 USPC .................................. 375/219, 265, 295, 298
 See application file for complete search history.

(56) References Cited

U.S. PATENT DOCUMENTS

| | | | | |
|---|---|---|---|---|
| 3,969,674 A | * | 7/1976 | Tracey | 375/235 |
| 5,838,732 A | * | 11/1998 | Carney | 375/297 |
| 6,034,564 A | * | 3/2000 | Iwamatsu | 329/306 |
| 6,625,116 B1 | * | 9/2003 | Schneider et al. | 370/226 |
| 6,714,529 B1 | * | 3/2004 | Tanabe et al. | 370/343 |
| 6,895,040 B2 | * | 5/2005 | Zhou | 375/220 |
| 2001/0050926 A1 | * | 12/2001 | Kumar | 370/529 |
| 2002/0110206 A1 | * | 8/2002 | Becker et al. | 375/346 |

* cited by examiner

*Primary Examiner* — Chieh M Fan
*Assistant Examiner* — Brian J Stevens
(74) *Attorney, Agent, or Firm* — Richard Bachand; Bruce Greenhaus

(57) ABSTRACT

A communication system is disclosed that allows high data-rate transmission of data between components. N-bit parallel data is transmitted in K-frequency separated channels on the transmission medium so as to fully take advantage of the overall bandwidth of the transmission medium. As a result, a very high data-rate transmission can be accomplished with low data-bit transmission on individual channels. A transmitter system and a receiver system are described for the communication system.

23 Claims, 14 Drawing Sheets

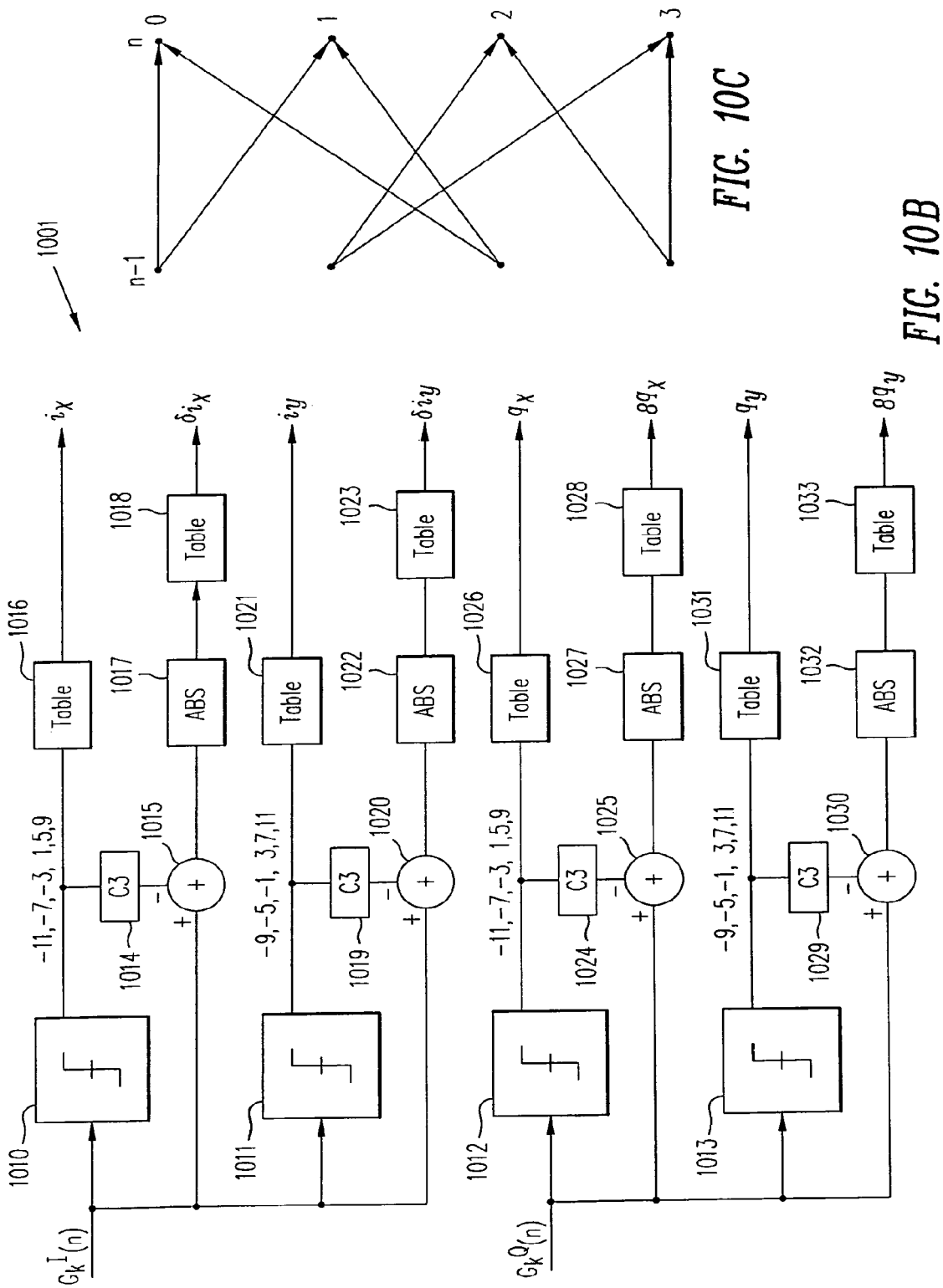

LOW COMPLEXITY HIGH-SPEED COMMUNICATIONS TRANSCEIVER

RELATED APPLICATIONS

The present application is a continuation of U.S. application Ser. No. 09/965,242, filed on Sep. 26, 2001, which is a continuation-in-part of U.S. application Ser. No. 09/904,432, filed on Jul. 11, 2001, assigned to the same entity as is the present application, herein included by reference in its entirety.

BACKGROUND

1. Field of the Invention

The present invention is related to high-speed communications of data in a communication system and, in particular, to high data rate transmission of data between components in a communication system.

2. Discussion of Related Art

Many conventional systems for transmitting data between components within a cabinet or between cabinets of components utilize copper or optical backplanes for transmission of digital data. For example, high data rate transceiver systems are utilized in many backplane environments, including optical switching devices, router systems, switches, chip-to-chip communications and storage area networking switches. Other environments that utilize high speed communication between components include inter-cabinet communications and chip-to-chip communications. Typical separations of components in such systems is between about 0.1 and about 10 meters.

Existing techniques utilized in such environments typically use non-return to zero (NRZ) modulation to send and receive information over high-speed backplanes or for high data rate chip-to-chip interconnects. Typically, the transceiver for sending high-speed data over a backplane is called a serializer/deserializer, or SERDES, device.

FIG. 1A shows a block diagram of a backplane environment 100. Components 101-1 through 101-Q are coupled to transmit and receive data through input/output (I/O) ports 102-1 through 102-Q, respectively, to backplane 110. Conventionally, components 101-1 through 101-Q are SERDES devices.

FIG. 1B shows a block diagram of a conventional transmitter portion of one of SERDES devices 101-1 through 101-Q on I/O ports 102-1 through 102-Q, respectively. Parallel data is received in a bit encoder 105. Bit encoder 105 encodes the parallel data, for example by adding redundancy in the input data, to ensue a minimum rate of data transitions in the output data stream. Typical encoding schemes include rate 8/10 (8 bit input to 10 bit output) encoding. The parallel data is serialized in parallel to serial converter 106. Output driver 107 then receives the serialized data from parallel to serial converter 106 and outputs, usually, a differential voltage signal for transmission over backplane 110. In addition, there is typically a phase locked loop (PLL) 114 that provides the necessary clock signals for encoder 105 and parallel-to-serial converter 106. The input signal to PLL 114 is a reference clock signal from a system PLL 103.

FIG. 1C shows a conventional receiver 108 of one of SERDES devices 101-1 through 101-Q on I/O ports 102-1 through 102-Q, respectively, of FIG. 1A. Input driver 109 receives differential voltage signal from backplane 110 and outputs the analog data signal to clock and data recovery circuit 113. Data recovery 113 can, in some systems, perform equalization, recover the timing and output a serial bit stream of data to serial-to-parallel converter 111. The serial data is input to bit decoder 112 which converts the parallel data to parallel decoded data. Clock and data recovery circuit 113 also outputs the necessary clock signals to serial-to-parallel converter 111 and bit decoder 112.

A conventional SERDES system 100 can enable serial data communication at data rates as high as 2.5 Gbps to 3.125 Gbps over a pair of FR4 copper traces in a copper backplane communication system. The biggest problem with existing SERDES systems 100 is that they are very bandwidth inefficient, i.e., they require 3.125 GHz of bandwidth to transmit and receive 2.5 of data over a single pair of copper wires. Therefore, it is very difficult to increase the data rates across backplane bus 110, Additionally, SERDES system 100 requires the implementation of a high clock rate (3.125 GHz for 2.5 Gbps data rates) phase locked loop (PLL) 114 implemented to transmit data and recovery of high clock rates in data recovery 113. The timing window within which receiver 108 needs to determine whether the received symbol in data recovery 110 is a 1 or a 0 is about 320 ps for the higher data rate systems. This timing window creates extremely stringent requirements on the design of data recovery 113 and PLL 114, as they must have very low peak-to-peak jitter.

Conventional SERDES system 100 also suffers from other problems, including eye closure due to intersymbol interference (ISI) from the dispersion introduced by backplane 110. The ISI is a direct result of the fact that the copper traces of backplane 110 attenuate higher frequency components in the transmitted signals more than the lower frequency components in the transmitted signal. Therefore, the higher the data rate the more ISI suffered by the transmitted data. In addition, electrical connectors and electrical connections (e.g., vias and other components) used in SERDES device 100 cause reflections, which also cause ISI.

To overcome these problems, equalization must be performed on the received signal in data recovery 113. However, in existing very high data-rate communication systems, equalization is very difficult to perform, if not impossible due to the high baud rate. A more commonly utilized technique for combating ISI is known as "pre-emphasis", or pre-equalization, performed in bit encoder 105 and output driver 107 during transmission. In some conventional systems, the amplitude of the low-frequencies in the transmitted signal is attenuated to compensate for the higher attenuation of the high frequency component by the transmission medium of bus 110. While this makes the receiver more robust to ISI, pre-emphasis reduces the overall noise tolerance of transmission over backplane 110 of backplane communication system 100 due to the loss of signal-to-noise ratio (SNR). At higher data rates, conventional systems quickly become intractable due to the increased demands.

Therefore, there is a need for a more robust system for transmitting data between components on a backplane or data bus at very high speeds.

SUMMARY

In accordance with the present invention, a data transmission system is presented that allows very high data transmission rates over a data bus that utilizes the signal attenuation properties of the copper based backplane interconnect system. In addition, this transmission scheme does not result in increased intersymbol interference at the receiver despite transmitting data at a very high speed. The data transmission system includes a transmitter system and a receiver system coupled through a transmission medium. The transmitter system receives parallel data having N bits and separates the N bits into K subsets for transmission into K frequency separated channels on the transmission medium. The receiver system receives the data from the K frequency separated channels from the transmission medium and recovers the N parallel bits of data. In some embodiments, the N parallel bits are separated into K subsets of bits, the K subsets of bits are encoded into K symbols, each of which is up-converted to a carrier frequency appropriate to one of the K channels. The summed output signal resulting from up-converting into each of the K channels is transmitted over the transmission medium.

In some embodiments, the transmitter system includes K separate transmitters. Each of the K transmitters receives a subset of the N-bits, encodes the subset of bits, and modulates the encoded symbols with a carrier signal at a frequency separated from that of others of the K transmitters. The summed signals from each of the K separate transmitters is transmitted over the transmission medium. The transmission medium can be any medium, including optical, infrared, wireless, twisted copper pair, or copper based backplane interconnect channel.

In some embodiments, each of the K transmitters receives a subset of the N data bits, encodes the subset, maps the encoded subset onto a symbol set, and up-converts the analog symbol stream to a carrier frequency assigned to that transmitter. The up-converted symbol stream is then transmitted through the transmission medium to a receiver system having a receiver for down-converting and recovering the data stream transmitted on each of the carrier frequencies. For example, in some embodiments each of the K transmitters receives the subset of bits, encodes them with a trellis encoder and maps them onto a quadrature-amplitude modulated (QAM) symbol set. In some embodiments, the symbols output from the QAM mapping are processed through a digital-to-analog converter before being up-converted to a carrier frequency to produce the output signal from the transmitter. Any encoding and symbol mapping scheme can be utilized.

Each of the output signals from the K transmitters are summed for transmission in K separate transmission channels on the transmission medium. The receiver receives the summed signals, with data transmitted at K separate channels. In some embodiments, the receiver downconverts the summed signals by the frequency of each of the K separate channels to recover the symbols transmitted in each of the K separate channels. The subsets of digital data can then be recovered from the recovered symbols.

The receiver system receives the combined signal, separates the signal by carrier frequency, and recovers the bits from each carrier frequency. In some embodiments, the signal received from the transmission medium is received into K parallel receivers. Each of the K receivers separates out the signal centered around the carrier frequency allocated to that channel by the transmitter, equalizes the signal, and decodes the signal to retrieve the subset of N bits assigned to the corresponding transmitter modulator.

As a result, parallel streams of serial data bits are separated into separate subsets which are transmitted on different frequency bands to form separate channels on the transmission medium. Therefore, the data rate and the symbol rate transmitted in each of the separate channels can be much lower than the overall data transmission rate. The lower data rate and symbol rate in each channel provides for simpler receiver processing with many fewer problems (e.g., speed of components utilized for equalization and data recovery) than the high data rate transmissions. In addition, because the symbol rates are lower, the amount of receiver equalization needed on each of the K channels can be smaller, and can be implemented with a simpler equalization structure. Because of the lower symbol rates, receiver signals can be processed with complex, optimal algorithms.

In some embodiments, the transmission into each of the available transmission channels can be bit-loaded so that the channels occupying the lower part of the frequency spectrum can be modulated with higher order symbol constellations to provide higher bit throughput per modulated symbol in those channels. Conversely, the channels occupying the higher carrier frequencies can be modulated with lower order symbol constellations to provide lower numbers of bits per modulated symbol. By performing bit-loading, the data throughput that can be achieved over the transmission medium, for example a copper based interconnect system, can be maximized because the signal-to-noise ratio (SNR) available in the channel is higher at lower frequencies in the channel than in the higher frequencies. Thus, the bit-loaded transmission technique can be tailored to maximize the overall capacity of a copper based interconnect system. In embodiments with QAM symbol constellations, for example, QAM constellations with more symbols (and therefore which can carry more bits per symbol) can be transmitted in channels with lower carrier frequencies while QAM constellations with fewer symbols (and therefore representing fewer bits per symbol) can be transmitted in channels with higher carrier frequencies.

A transmission system according to the present invention can include a plurality of transmitters, each of the plurality of transmitters transmitting data in one of a plurality of transmission bands, at least one of the plurality of transmitters comprising a trellis encoder coupled to receive data to be transmitted; a symbol mapper coupled to receive output signals from the trellis encoder; at least one digital to analog converter coupled to receive output signals from the symbol mapper; at least one filter coupled to receive analog output signals from the at least one digital to analog converter; and an up-converter coupled to receive output signals from the at least one filter and shift a frequency of the output signal to an assigned frequency.

The symbol mapper can by any symbol mapper, for example a 128 QAM symbol mapper. The encoder can encode any of the subset of bits, for example the most-significant bit. The filter can be an analog low-pass filter with a cut off frequency and an excess bandwidth that passes a base-band data signal but substantially filters out higher frequency signals. The filter can, in some embodiments, be characterized as a two-zero, five-pole filter with filter parameters chosen such that an output response of the at least one of the plurality of filters approximates a raised cosine function.

A transmission system in accordance with the present invention can include a plurality of receivers, each of the plurality of receivers receiving signals from one of a plurality of transmission bands, at least one of the plurality of receivers including a down converter that converts an input signal from the one of the plurality of transmission bands to a base band; a filter coupled to receive signals from the down converter, the filter substantially filtering out signals not in the base band; an analog-to-digital converter coupled to receive signals from the filter and generate digitized signals; an equalizer coupled to receive the digitized signals; and a trellis decoder coupled to receive signals from the equalizer and generate recreated data, the recreated data being substantially the same data transmitted by a corresponding transmitter.

In some embodiments, the filter includes filters that can be characterized with two-zero, five-pole functions with parameters chosen such that the response of the filters is substantially a raised cosine function. In some embodiments, the transmit and receiver filters are chosen to be substantially the same and the combination set to provide overall filtering.

In some embodiments, the down-converter generates in-phase and quadrature signals by multiplying the input signal with a cosine function and a sine function, respectively, with frequency equal to an estimate of the center frequency of the transmission band. In some embodiments, the output signals from the down converter may be offset. In some embodiments, the offset values can be set such that output signals from the analog-to-digital converters average 0. In some embodiments, a small rotation and amplitude adjustment can be applied between digitized in-phase and quadrature signals. In some embodiments, a phase rotation can be applied to digitized in-phase and quadrature corrections. Further, a digital offset can be applied to the digitized in-phase and out-of-phase signals. Further, a quadrature correction can be applied to the output signals from the equalizer. Additionally, further amplification can be applied to the output signals from the equalizer. Additionally, a further offset can be applied to the output signals from the equalizer such that an error signal between sliced values and input values to a slicer are zeroed. Parameters for offsets, amplifiers, phase rotators, quadrature rotators, and equalizers can be adaptively chosen.

These and other embodiments are further discussed below with respect to the following figures.

SHORT DESCRIPTION OF THE FIGURES

FIGS. 10A, 10B and 10C illustrate an embodiment of a trellis decoder.

In the figures, elements designated with the same identifications on separate figures are considered to have the same or similar functions.

DETAILED DESCRIPTION

Figure 1B:
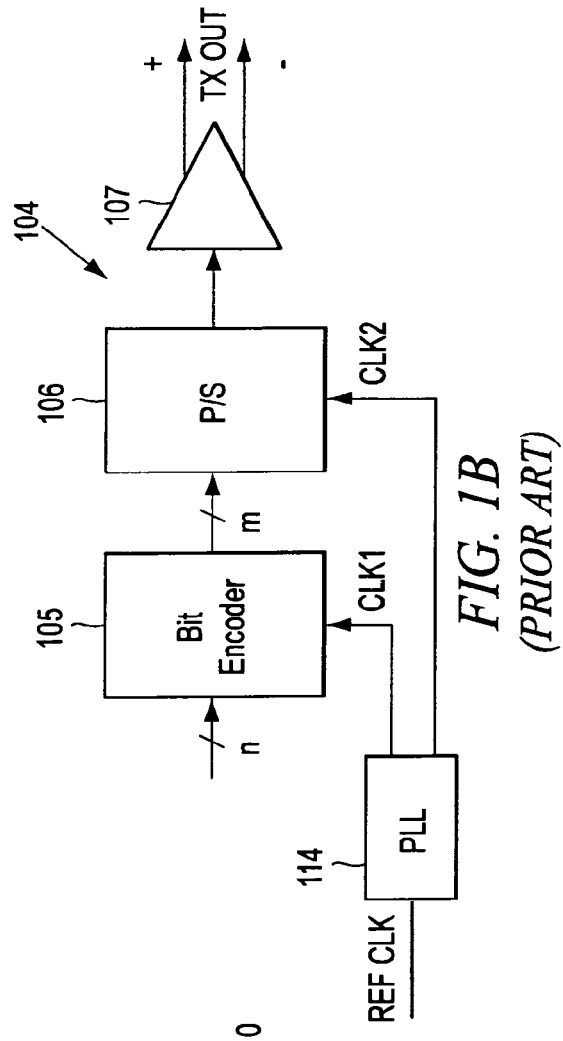
FIGS. 1A, 1B and 1C show block diagrams for a conventional system of transmitting data over a backplane.
Figure 1C:
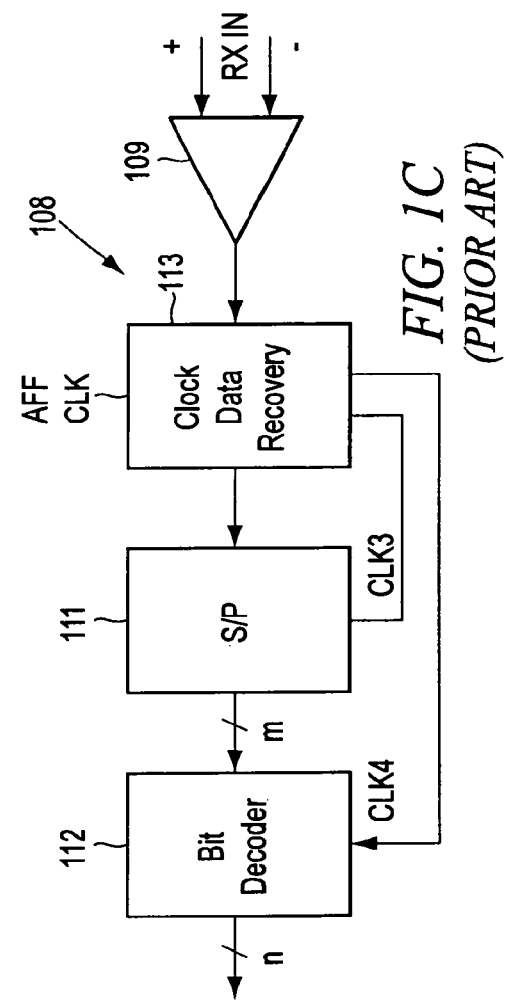
Figure 1A:
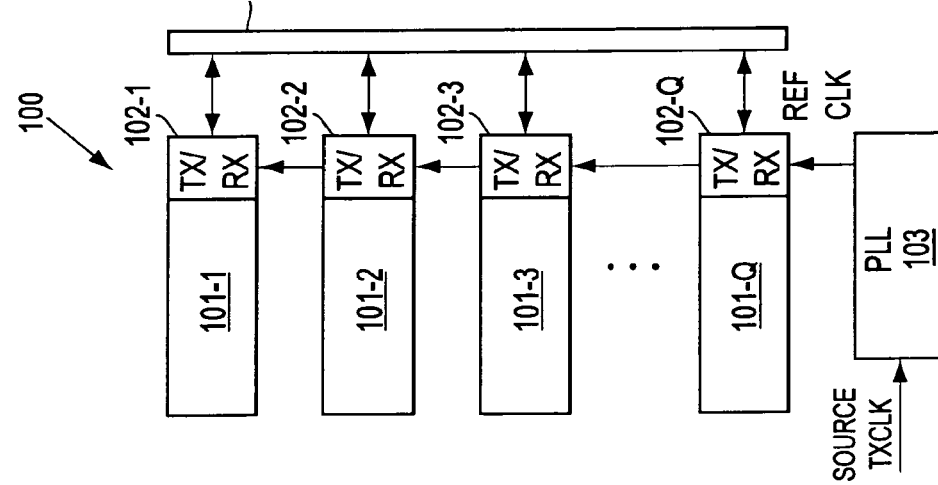
Figure 2A:
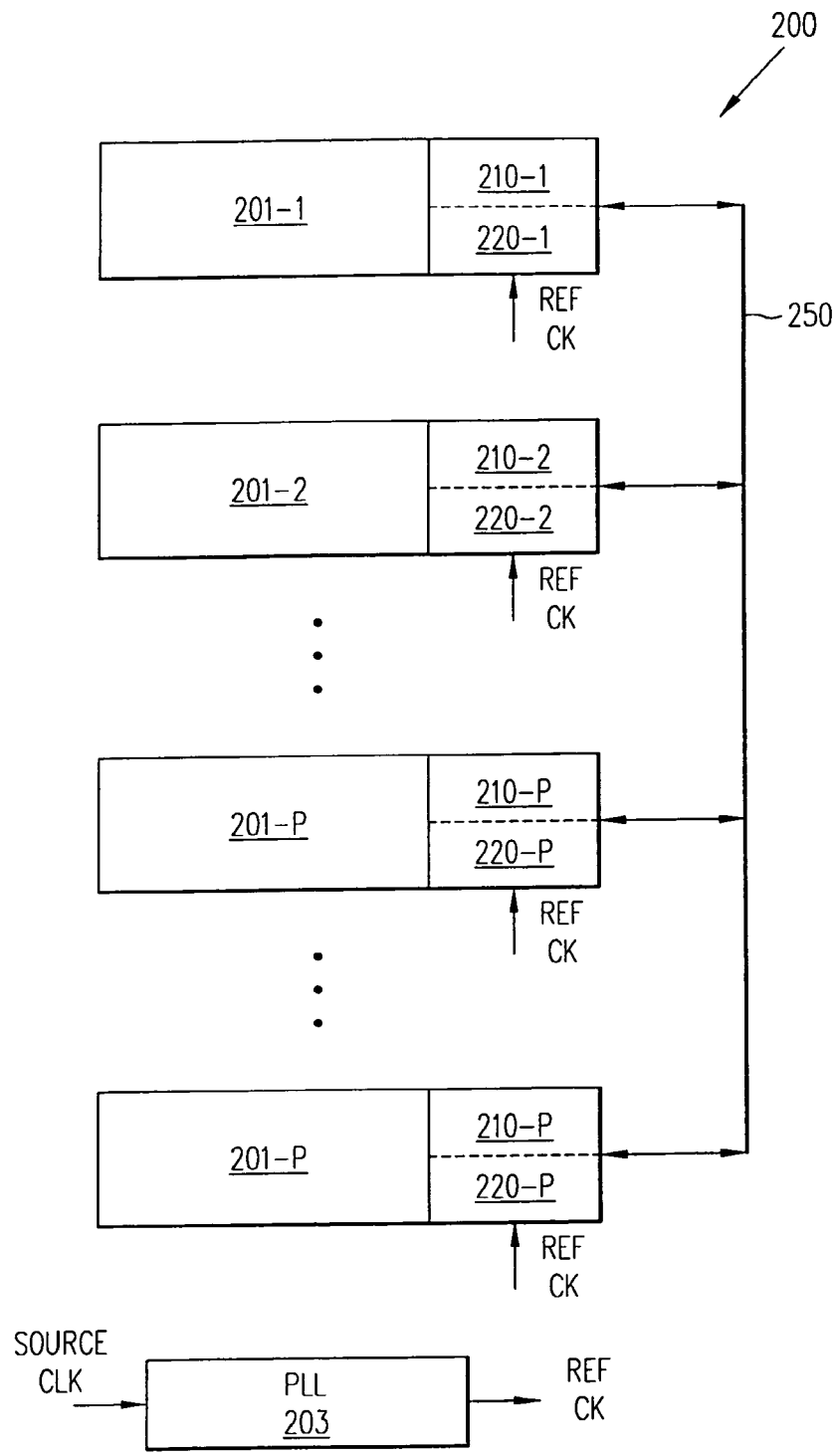
FIG. 2A shows a block diagram of a transmission system according to the present invention.

FIG. 2A shows a block diagram of a transmission system 200 according to the present invention. System 200 includes any number of components 201-1 through 201-P, with component 201-$p$ representing an arbitrary one of components 201-1 through 201-P, coupled through a transmission medium 250. Transmission medium 250 may couple component 201-$p$ to all of the components 201-1 through 201-P or may couple component 201-$p$ to selected ones of components 201-1 through 201-P. In some embodiments, components 201-1 through 201-P are coupled through FR4 copper traces.

System 200 can represent any backplane system, any chassis-to-chassis digital communication system, or any chip-to-chip interconnect with components 201-1 through 201-P representing individual cards, cabinets, or chips, respectively.

Transmission channel 250 can represent any transmission channel, including optical channels, wireless channels, or metallic conductor channels such as copper wire or FR4 copper traces. Typically, transmission channel 250 attenuates higher frequency signals more than low frequency signals. As a result, intersymbol interference problems are greater for high data rate transmissions than for lower data rate transmissions. In addition, cross-talk from neighboring signals increases with transmission frequency.

Components 201-1 through 201-P include transmitter systems 210-1 through 210-P, respectively, and receiver systems 220-1 through 220-P, respectively. Further, in some embodiments, timing for all of components 201-1 through 201-P can be provided by a phase-locked-loop (PLL) 203 synchronized to a transmit source clock signal. In some embodiments, PLL 203 provides a reference clock signal and each of components 201-1 through 201-P can include any number of phase locked loops to provide internal timing signals.

In some systems, for example backplane systems or cabinet interconnects, the transmission distance through transmission channel 250, i.e. the physical separation between components 201-1 through 201-P, can be as low as 1 to 1.5 meters. In some chip-to-chip environments, the physical separation between components 201-1 though 201-P can be much less (for example a few millimeters or a few centimeters). In some embodiments of the present invention, separations between components 201-1 through 201-P as high as about 100 meters can be realized. Furthermore, in some embodiments transmission channel 250 can be multiple twisted copper pair carrying differential signals between components 201-1 through 201-P. In some embodiments, components 201-1 through 201-P can share wires so that fewer wires can be utilized. In some embodiments, however, dedicated twisted copper pair can be coupled between at least some of components 201-1 through 201-P. Further, transmission medium 250 can be an optical medium, wireless medium, or data bus medium.

Figure 2B:
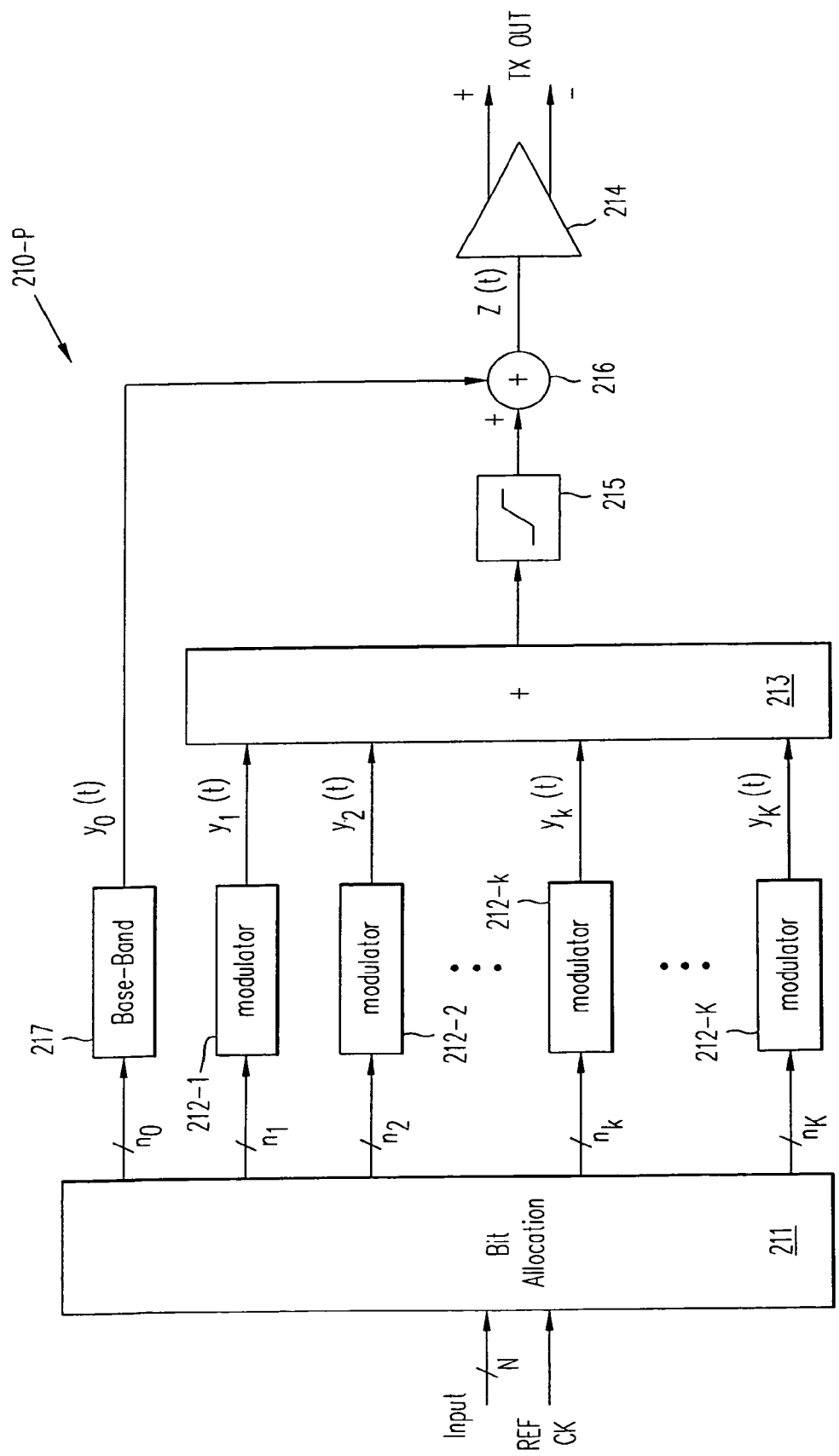
FIG. 2B shows a block diagram of a transmitter according to the present invention.

FIG. 2B shows a block diagram of an embodiment of transmitter system 210-$p$, an arbitrary one of transmitter systems 210-1 through 210-P. Transmitter system 210-$p$ receives an N-bit parallel data signal at a bit allocation block 211. Bit allocation block 211 also receives the reference clock signal from PLL 203. Bit allocation block 211 segregates the N input bits into K individual channels such that there are $n_1$ through $n_K$ bits input to transmitters 212-1 through 212-K, respectively. In some embodiments, each of the N bits is assigned to one of the K individual channels so that the sum of $n_1$ through $n_K$ is the total number of bits N. In some embodiments, bit allocation block 211 may include error pre-coding, redundancy, or other overall encoding such that the number of bits output, i.e. $\Sigma_{i=1}^{K} n_i$, is greater than N.

Figure 3:
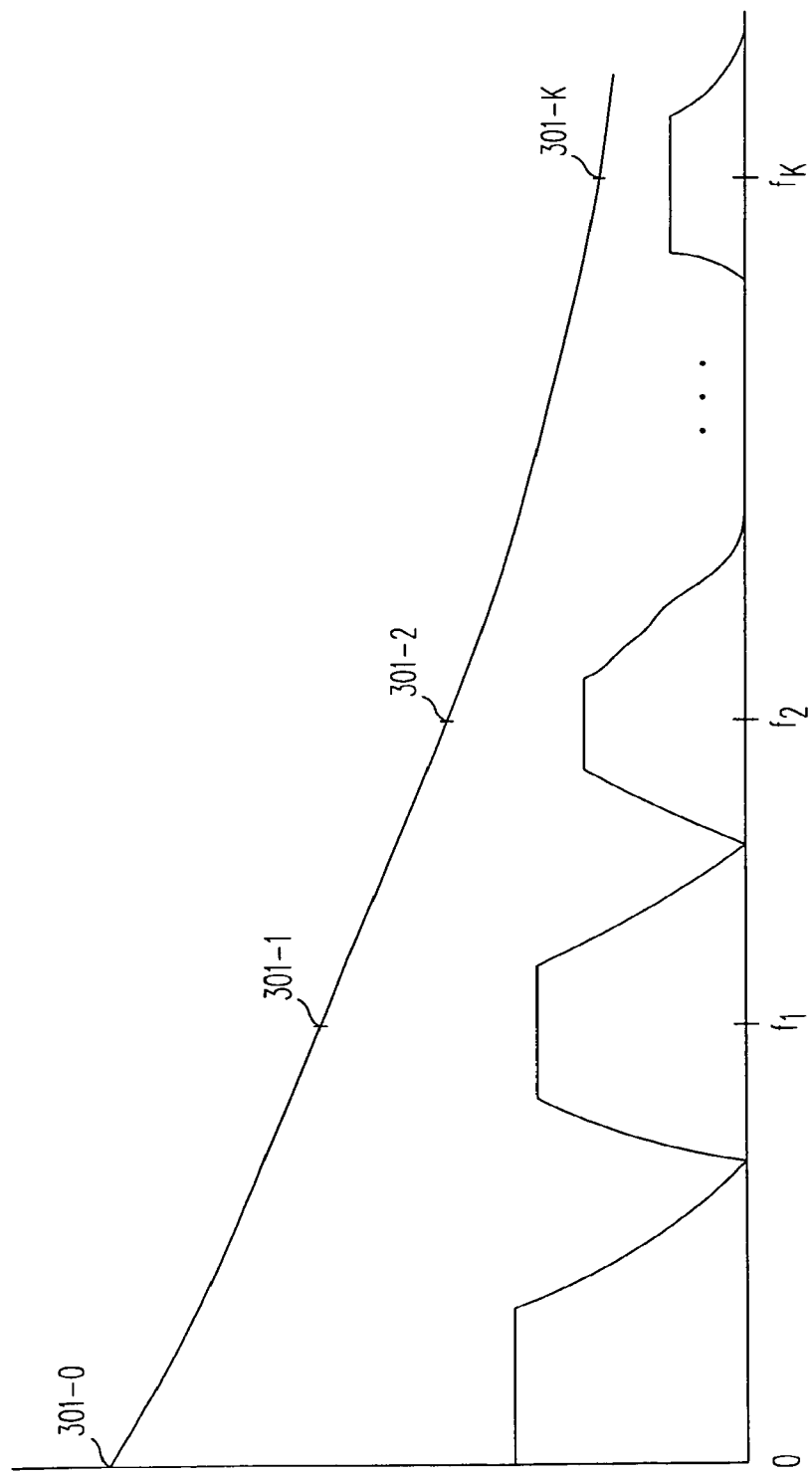
FIG. 3 shows a graph of attenuation versus transmission band on the transmission medium according to the present invention.

Each of transmitters 212-1 through 212-K encodes the digital data input to it and outputs a signal modulated at a different carrier frequency. Therefore, the $n_k$ digital data bits input to transmitter 212-$k$, an arbitrary one of transmitters 212-1 through 212-K, is output as an analog signal in a kth transmission channel at a carrier frequency $f_k$. FIG. 3 shows schematically the transport function for a typical transmission channel 250 (FIG. 2A), H(f). As is shown, the attenuation at higher frequencies is greater than the attenuation at lower frequencies. Transmitters 212-1 through 212-K transmit analog data at carrier frequencies centered about frequencies $f_1$ through $f_K$, respectively. Therefore, transmitters 212-1 through 212-K transmit into transmission channels 301-1 through 301-K, respectively. In some embodiments, the width of each of transmission channels 301-1 through 301-K can be the same. The width of the bands of each of transmission channels 301-1 through 301-K can be narrow enough so that there is little to no overlap between adjacent ones of transmission channels 301-1 through 301-K. In some embodiments, since the attenuation for the lower frequency channels is much smaller than the attenuation for the higher frequency channels, lower frequency channels can be bit-loaded to carry higher number of bits per baud interval than the number of bits per baud interval that can be carried at higher carrier frequencies.

The analog output signal from each of transmitters 212-1 through 212-K, $y_1(t)$ through $y_K(t)$, then represents the transmission signal in each of channels 301-1 through 301-K, respectively. Signals $y_1(t)$ through $y_K(t)$, then, are input to summer 213 and the summed analog signal $z(t)$ is input to output driver 214. In some embodiments, output driver 214 generates a differential transmit signal corresponding to signal $z(t)$ for transmission over transmission medium 250. Output driver 214, if transmission medium 250 is an optical medium, can also be an optical driver modulating the intensity of an optical signal in response to the signal $z(t)$.

Figure 2C:
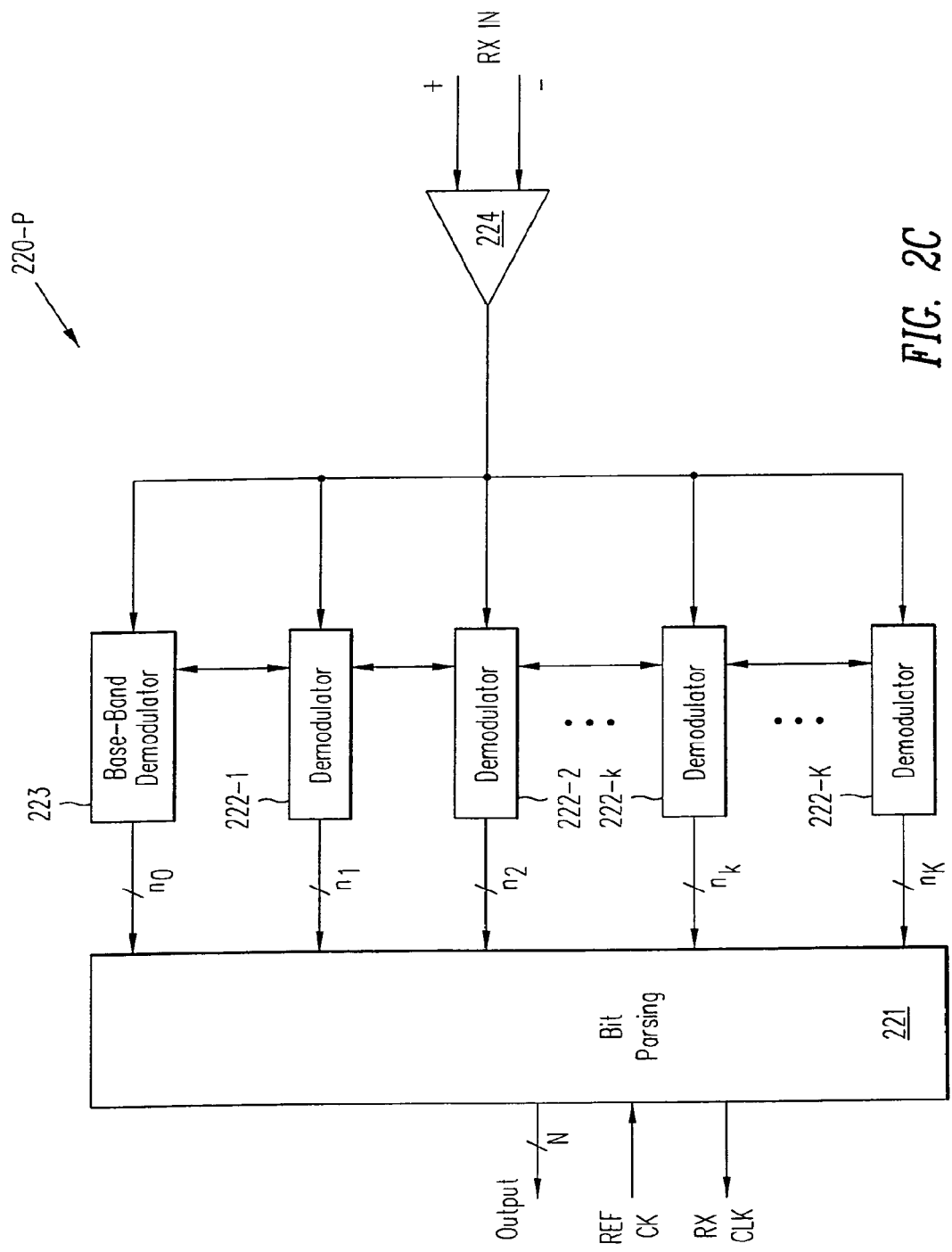
FIG. 2C shows a block diagram of a receiver according to the present invention.

FIG. 2C shows an embodiment of a receiver system 220-$p$, which can be an arbitrary one of receiver systems 220-1 through 220-P of FIG. 2A. Receiver system 220-$p$ can receive a differential receive signal, which originated from one of transmitter systems 210-1 through 210-P, into an input buffer 224. In some embodiments, an optical signal can be received at input buffer 224, in which case input buffer 224 includes an optical detector. The output signal from input buffer 224, Z(t), is closely related to the output signal $z(t)$ of summer 213. However, the signal Z(t) shows the effects of transmission through transmission medium 250 on $z(t)$, including intersymbol interference (ISI).

The signal Z(t) is input to each of receivers 222-1 through 222-K. Receivers 222-1 through 222-K demodulate the signals from each of the transmission channels 301-1 through 301-K, respectively, and recovers the bit stream from each of carrier frequencies $f_1$ through $f_K$, respectively. The output signals from each of receivers 222-1 through 222-K, then, include parallel bits $n_1$ through $n_K$, respectively. The output signals are input to bit parsing 221 where the transmitted signal having N parallel bits is reconstructed. Receiver system 220-$p$ also receives the reference clock signal from PLL 203, which is used to generate internal timing signals. Furthermore, receiver system 220-$p$ outputs a receive clock signal with the N-bit output signal from bit parsing 221.

In some embodiments, N-bits of high-speed parallel digital data per time period is input to bit allocation 211 of transmitter system 210-$p$ along with a reference clock signal. Data is transmitted at a transmit clock rate of CK1, which can be determined by an internal phase-locked-loop from the reference clock signal. Each of these input signals of N-bits can change at the rate of a transmit clock signal CK1. The transmit clock signal CK1 can be less than or equal to $\eta$ GHz/N, where $\eta$ represents the total desired bit rate for transmission of data from transmitter system 210-$p$ over transmission medium 250. The resultant maximum aggregate input data rate, then, equals $\eta$ Gbps. The $\eta$ Gbps of aggregate input data is then split into K sub-channels 301-1 through 301-K (see FIG. 3) which are generated by transmitters 212-1 through 212-K, respectively, such that:

$$\sum_{k=1}^{K} B_k n_k = \eta Gbps, \tag{1}$$

where $n_k$, is the number of bits transmitted through the kth transmission band, centered about frequency $f_k$, with a symbol baud rate on the $k^{th}$ sub-channel being equal to $B_k$.

In some embodiments of the invention, each of the K sub-channels 301-1 through 301-K can have the same baud rate B. In general, the baud rate Bk of one sub-channel 301-$k$, which is an arbitrary one of sub-channels 301-1 through 301-K, can differ from the baud rate of other sub-channels. Additionally, bit-loading can be accomplished by choosing symbol sets which carry a larger number of bits of data for transmission channels at lower frequencies and symbol sets which carry a lower number of bits of data for transmission channels at higher frequencies (i.e., $n_k$ is higher for lower frequencies).

In the case of a copper backplane interconnect channel of trace length l<2 meters, for example, the signal-to-noise ratio of the lower carrier frequency channels is substantially greater than the signal-to-noise ratio available on the higher sub-channels because the signal attenuation on the copper trace increases with frequency and because the channel noise resulting from alien signal cross-talk increases with frequency. These properties of the copper interconnect channel can be exploited to "load" the bits/baud of the K sub-channels so that the overall throughput of the interconnect system is maximized. For example, digital communication signaling schemes (modulation+coding), see, e.g. BERNARD SKLAR, DIGITAL COMMUNICATIONS, FUNDAMENTALS AND APPLICATIONS (Prentice-Hall, Inc., 1988), can be utilized that provide higher bit density per baud interval over channels occupying the lower region of the frequency spectrum, and that result in lower bit density over channels that occupy higher frequencies. This "bit-loading" is especially important when the data rates over copper interconnect channel need to be increased, for example to a rate in excess of 10 Gbps per differential copper pair.

Figure 4:
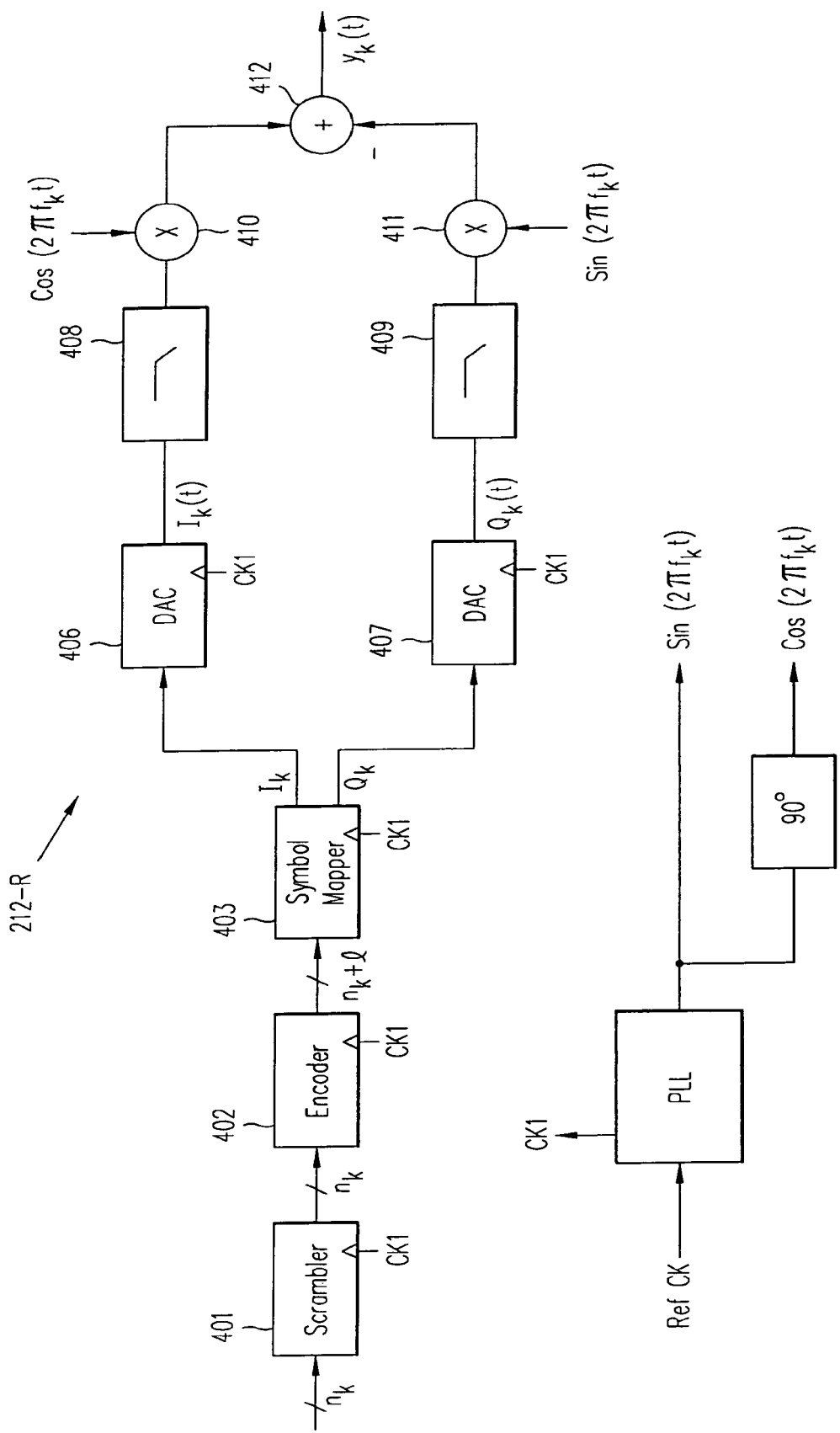
FIG. 4 shows a block diagram of an embodiment of a transmission modulator according to the present invention.

FIG. 4 shows an embodiment of transmitter 212-$k$, an arbitrary one of transmitters 212-1 through 212-K. Transmitter 212-$k$ receives $n_k$ bits per baud interval, $1/B_k$, for transmission into sub-channel 301-$k$. The $n_k$ bits are received in scrambler 401. Scrambler 401 scrambles the $n_k$ bits and outputs a scrambled signal of $n_k$ bits, which "whitens" the data.

The output signal of $n_k$ parallel bits is then input to encoder 402. Although any encoding scheme can be utilized, encoder 402 can be a trellis encoder for the purpose of providing error correction capabilities. Trellis coding allows for redundancy in data transmission without increase of baud rate, or channel bandwidth. Trellis coding is further discussed in, for example, BERNARD SKLAR, DIGITAL COMMUNICATIONS, FUNDAMENTALS AND APPLICATIONS (Prentice-Hall, Inc., 1988), G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp.

12-21. Other encoding schemes include block coding schemes such as Reed-Solomon encoders, and BCH encoders, see, e.g., G. C. CLARK, JR., AND J. B. CAIN., ERROR CORRECTION CODING FOR DIGITAL COMMUNICATIONS (Plenum Press, New York, 1981), however they result in an increase of channel bandwidth usage. Typically, the signal output from encoder 402 includes more bits than $n_k$, $n_k$+le. In some embodiments, encoder 402 can be a trellis encoder which adds one additional bit, in other words encoder 402 can be a rate $n_k/n_k$+1 encoder, see, e.g., G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21. In some embodiments, additional bits can be added to insure a minimum rate of transitions so that timing recovery can be efficiently accomplished at receiver 220-p.

Figure 6A:
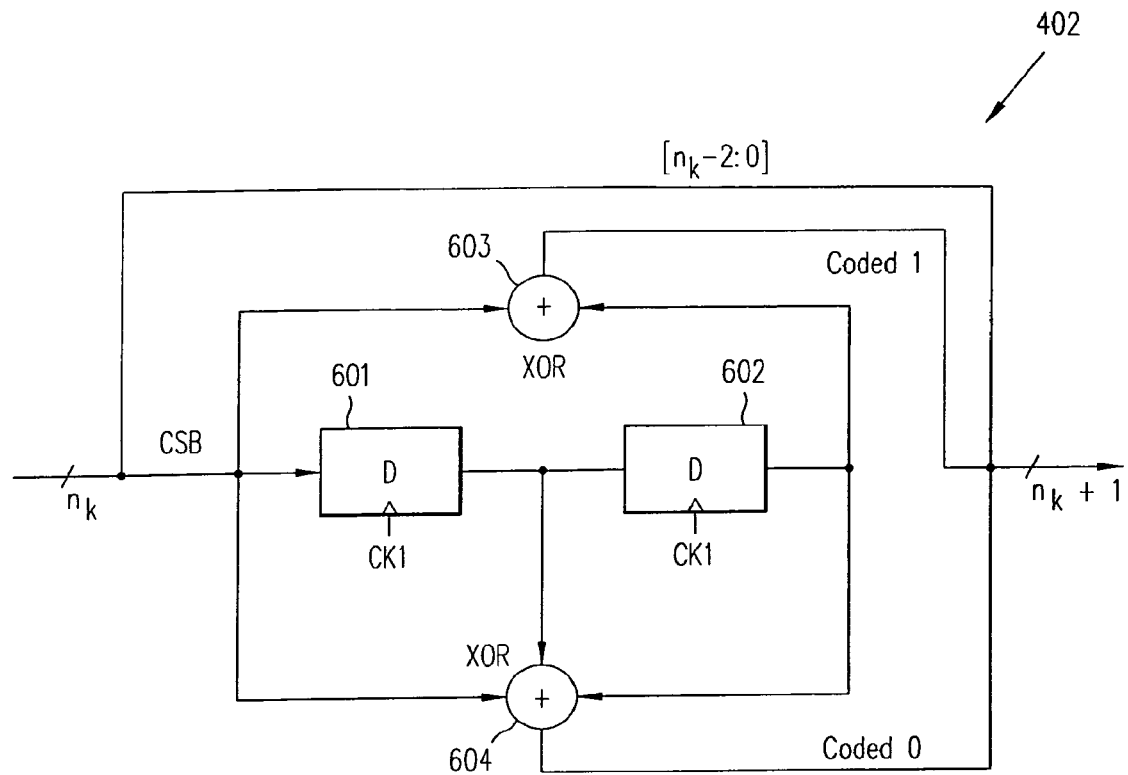
FIG. 6A shows a schematic diagram of a trellis encoder according to the present invention.

FIG. 6A shows an embodiment of encoder 402. Encoder 402 of FIG. 6A is an $n_k/n_k$+1 trellis encoder, Encoder 402 of FIG. 6a performs a rate ½ convolutional coding on the most-significant-bit (MSB) of the $n_k$ bit input signal. The MSB is input to delay 601. The output signal from delay 601 is input to delay 602. The MSB and the output signal from delay 602 are input to XOR adder 603. The output from XOR adder 603 provides a coded bit. The MSB, the output signal from delay 601, and the output signal from delay 602 are XORed in adder 604 to provide another coded bit. The two coded bits are joined with the remaining $n_k$–1 bits to form a $n_k$+1 bit output signal. Delays 601 and 602 are each clocked at the symbol baud rate B. One skilled in the art will recognize that other embodiments of encoder 402 can be utilized with embodiments of this invention.

In transmitter 212-k of FIG. 4, the output signal from encoder 402 is input to symbol mapper 403. Symbol mapper 403 can include any symbol mapping scheme for mapping the parallel bit signal from encoder 402 onto symbol values for transmission. In some embodiments, symbol mapper 403 is a QAM mapper which maps the ($n_k$+le) bits from encoder 402 onto a symbol set with at least $2_k^{(n+le)}$ symbols. As shown in FIG. 6a, le=1 in the output signal from encoder 402. A trellis encoder in conjunction with a QAM mapper can provide a trellis encoded QAM modulation for sub-channel 301-k.

Figure 6B:
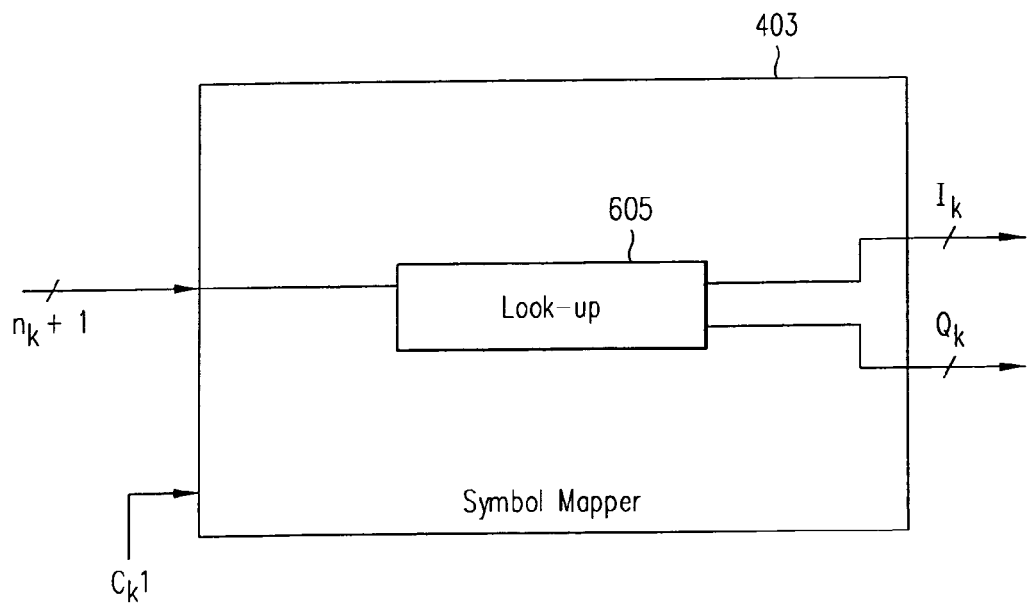
FIG. 6B shows a schematic diagram of a symbol mapper according to the present invention.

FIG. 6B shows an embodiment of symbol mapper 403. Symbol mapper 403 receives the $n_k$+1 data bits from encoder 402 and generates a symbol which can include an inphase component $I_k$ and a quadrature component $Q_k$. In some embodiments, symbol mapper 403 includes a look-up table 605 which maps the $n_k$+1 input bits to the complex output symbol represented by $I_k$ and $Q_k$.

Table I shows an example symbol look-up table for conversion of a 7-bit data signal into a 128-symbol QAM scheme. Table entries are in decimal format with the in-phase values along the bottom row and the quadrature values represented along the last column. From Table I, a decimal value of 96, for example, results in an I value of –1 and a Q value of –1.

Figures 6C, 6E:
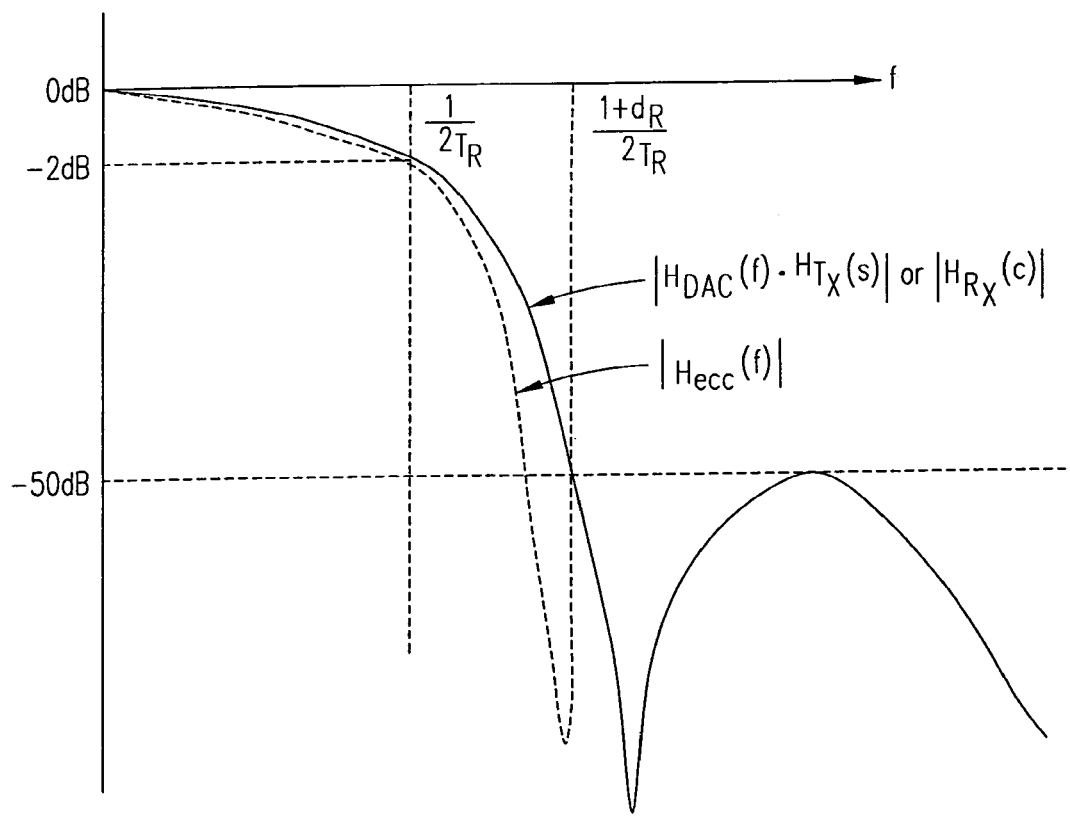
FIG. 6C shows a schematic diagram of a 128 QAM constellation.
FIG. 6E shows a raised cosine filter response.

In some embodiments, the QAM mapping can be segregated into groups of four as is shown in FIG. 6c. In some embodiments, with a 128 QAM system, then $n_k$+1 is 7. The two control bits from encoder 402 are arranged so that in groups of four symbols, the two control bits determine placement in the group. Control bits 00 and 11 and control bits 01 and 10 are in opposite corners of the groupings of four. This leads to a 6 dB gain in decoding at the receiver using this mapping scheme. Furthermore, the remaining five bits determine the actual grouping of four.

The output signal from symbol mapper 403 can be a complex signal represented by in-phase signal $I_k(n)$ and a quadrature signal $Q_k(n)$, where n represents the nth clock cycle of the clock signal CK1, whose frequency equals the baud rate $B_k$. Each of signals $I_k(n)$ and $Q_k(n)$ are digital signals representing the values of the symbols they represent. In some embodiments, a QAM mapper onto a constellation with 128 symbols can be utilized. An embodiment of a 128-symbol QAM constellation is shown in Table I. Other constellations and mappings are well known to those skilled in the art, see, e.g., BERNARD SKLAR DIGITAL COMMUNICATIONS, FUNDAMENTALS AND APPLICATIONS (Prentice-Hall, Inc., 1988) and E. A. LEE AND D. G. MESSERSCHMITT, DIGITAL COMMUNICATIONS (Kluwer Academic Publishers, 1988). The number of distinct combinations of $I_k(n)$ and $Q_k(n)$, then, represents the number of symbols in the symbol set of the QAM mapping and their values represents the constellation of the QAM mapping.

The signals from symbol mapper 403, $I_k(n)$ and $Q_k(n)$, are input to digital-to-analog converters (DACs) 406 and 407, respectively. DACs 406 and 407 operate at the same clock rate as symbol mapper 403. In some embodiments, therefore, DACs 406 and 407 are clocked at the symbol rate, which is the transmission clock frequency $B_k$.

Figure 6D:
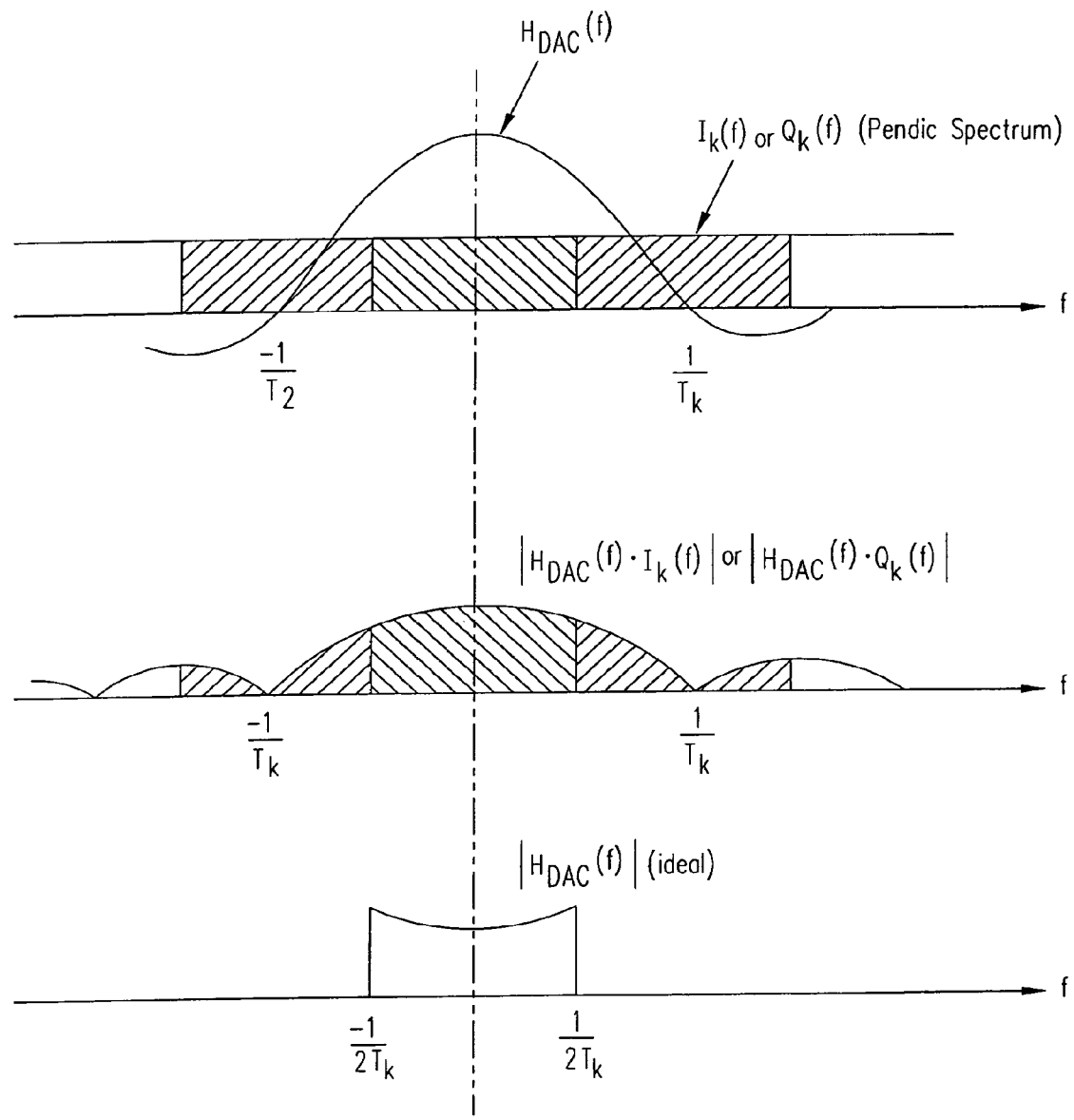
FIG. 6D shows filtering of the output signal from a digital to analog converter according to the present invention.

The analog output signals from DACs 406 and 407, represented by $I_k(t)$ and $Q_k(t)$, respectively, can be input to low-pass filters 408 and 409, respectively. Low pass filters 408 and 409 are analog filters that pass the symbols represented by $I_k(t)$ and $Q_k(t)$ in the base band while rejecting the multiple frequency range reflections of the base band signal. FIG. 6d shows a schematic diagram of the ideal requirements for filters 408 and 409. The filter function h(f) cuts off to include all of the base band signal while rejecting all of the higher frequency reflections of the base band signal created by DACs 406 and 407.

An example embodiment of filters 408 and 409 can be described by a two-zero, five-pole filter function of the form $$H_{TX}(S) = \frac{b_2 s^2 + b_1 s + b_0}{s^5 + a_4 s^4 \ldots + a_0}, \quad (2)$$

where s=j(2πf) and the coefficients $b_2$, $b_1$, $b_0$, and $a_4$ through $a_0$ are the parameters of filters 408 and 409. The parameters for filters 408 and 409, then, can be found by minimizing the cost function $$\int_0^\infty |H_{DAC}(f)H_{TX}(s) - H_{RRC}(f)e^{-j2\pi f t}|^2 W(f) df, \quad (3)$$

where $H_{DAC}(f)$ is the response of DACs 406 and 407, which can be given by $$H_{DAC}(f) = \frac{\sin(\pi f T_k)}{\pi f}, \quad (4)$$

where $T_k$ is the symbol period, W(f) is a weighting function, $H_{RRC}(f)$ a target overall response and τ is the time delay on the target response. The cost function is minimized with respect to the parameters of the filter (e.g., coefficients $b_2$, $b_1$, $b_0$, and $a_4$ through $a_0$) and the time delay τ. FIG. 6E shows an example of a target overall response function $H_{RRC}(f)$, which is a square-root raised cosine function. The function $H_{RRC}(f)$ can be determined by a parameter $\alpha_k$ a long with the baud rate frequency $1/T_k$ (which is the baud rate $B_k$ for transmitter 212-$k$). The parameter $\alpha_k$ is the excess bandwidth of the target function $H_{RRC}(f)$. In some embodiments, $\alpha_k$ can be set to 0. In some embodiments of the invention, $\alpha_k$ can be set to 0.6.

The weight function W(f) can be chosen such that the stop band rejection of $H_{TX}(S)$ is less than about −50 dB. Initially, W(f) can be chosen to be unity in the pass band frequency $0<f<(1+y_k)/2T_k$ and zero in the stop band frequency $f>(1+y_k)/2T_k$, where $y_k$ is the excess bandwidth factor of the $k^{th}$ channel. The minimization of the cost function of Equation 3 can be continued further by increasing W(f) in the stop band until the rejection of analog filters 408 and 409 is less than −50 dB.

In some embodiments, the overall impulse response of the transmit signal is a convolution of the impulse response of DACs 406 and 407 and the impulse response of transmit analog filter, i.e.

$$h_k^{Tx}(t) = h_k^f(t) \otimes h_k^{DAC}(t), \quad (5)$$

where $h_k^f(t)$ is the response of the filter and $h_k^{DAC}(t)$ is the response of DACs 406 and 407. In some embodiments, the DAC response $h_k^{DAC}(t)$ is a sinc function in the frequency domain and a rectangular pulse in the time domain. As shown in Equation 5, the overall response is a convolution of filters 408 and 409 with the response of DACs 406 and 407. The overall filter response can be close to the target response $H_{RRC}(f)$ when $h_k^{TX}(t)$ is determined with the cost function of Equation 3.

The output signals from low-pass filters 408 and 409, designated $I_k^{LPF}(t)$ and $Q_k^{LPF}(t)$, respectively, are then up-converted to a center frequency $f_k$ to generate the output signal of $y_k(t)$, the kth channel signal. The output signal from low-pass filter 408, $I_k^{LPF}(t)$, is multiplied by $\cos(2\pi f_k t)$ in multiplier 410. The output signal from low-pass filter 409, $Q_k^{LPF}(t)$, is multiplied by $\sin(2\pi f_k t)$ in multiplier 411. The signal $\sin(2\pi f_k t)$ can be generated by PLL 414 based on the reference clock signal and the signal $\cos(2\pi f_k t)$ can be generated by a $\pi/2$ phase shifter 413.

The output signals from multipliers 410 and 411 are summed in summer 412 to form $$y_k(t) = I_k^{LPF}(t)\cos(2\pi f_k t) - Q_k^{LPF}(t)\sin(2\pi f_k t), \quad (6)$$

The overall output of transmitter 210-$p$ (FIG. 2B), the output from summer 213, is then given by $$z(t) = \sum_{k=1}^{K} y_k(t), \quad (7)$$

In some embodiments, $B_k$ and $y_k$ can be the same for all channels and the center frequencies of channels 301-1 through 301-K, frequencies $f_1$ through $f_K$, respectively, can be chosen by $$f_k = B_k(1+Y_k)(k-0.5); \quad 1 \le k \le K. \quad (8)$$

In some embodiments, other center frequencies can be chosen, for example:

$$f_1 \ge 0.5 B_k(1+Y_k) \quad (9)$$

$$(f_k - f_{k-1}) \ge B_k(1+Y_k); k \ge 2.$$

The parameter $Y_k$ is the excess bandwidth factor. The bandwidth of the k-th channel, then, is $(1+Y_k)B_k$. In general, the center frequencies of channels 301-1 through 301-K can be any separated set of frequencies which substantially separate (i.e., minimizing overlap between channels) in frequency the transmission bands of transmission channels 301-1 through 301-K.

In some embodiments of the invention, DACs 406 and 407 may be moved to receive the output of summer 412. Further, in some embodiments DACs 406 and 407 can be replaced by a single DAC to receive the output of summer 213. However, such DACs should have very high sampling rates.

As an example, then, an embodiment of transmitter 210-$p$ capable of 10 Gbps transmission can be formed. In that case, $\eta=10$, i.e., an overall throughput of 10 Gbps from the transmitter to the receiver. Some embodiments, for example, can have K=8 channels 301-1 through 301-8, with the baud rate on each channel $B_k$ being 1.25 GHz/6 or about 208.333 Msymbols/sec in a 6/7 trellis encoding. In other words, $n_k=6$; ≤k≤8 and encoder 402 is a 6/7 rate trellis encoder. In some embodiments, K=16 (indicating channels 301-1 through 301-16), with baud rate on each channel $B_k$ being 625 MHz/6=104.1667 Msymbols/sec. Therefore, symbol mapper 403 can be a QAM symbol mapper with a 128-symbol constellation with baud rate $B_k$. The baud rate $B_k$, then, can be the same on all sub-channels 301-1 through 301-K. DACs 406 and 407 can have any resolution, limited only by the number of bits required to represent the symbol values output from symbol mapper 403. In some embodiments, DACs 406 and 407 are each 4 bit DACs. A schematic diagram of an embodiment of trellis encoder 402 and an embodiment of the resultant 128-QAM constellation mapping are shown in FIGS. 6A, 6B, and 6C, respectively. An example of a 128 symbol QAM mapping table is shown as Table I. The above described trellis encoder 402, in this embodiment, provides an asymptotic coding gain of about 6 dB over uncoded 128-QAM modulation with the same data rate, see, e.g., G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part 11. State of the Art," IEEE Communications Magazine, vol. 25, no. 2, February 1987, pp. 12-21.

Figure 5:
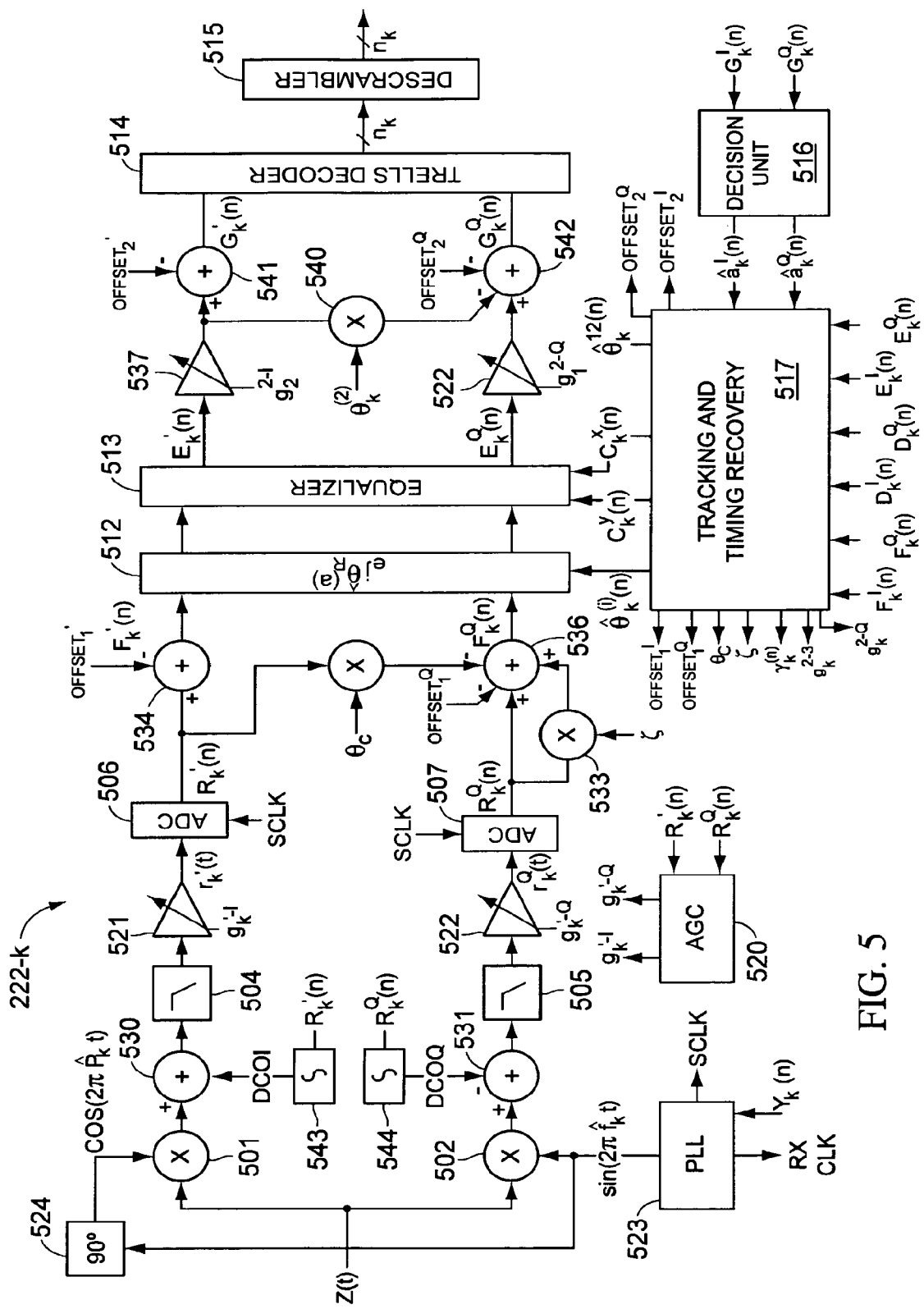
FIG. 5 shows a block diagram of an embodiment of a receiver demodulator according to the present invention.

FIG. 5 shows a block diagram of receiver 222-$k$ of receiver system 220-$p$, where receiver system 220-$p$ is an arbitrary one of receiver systems 220-1 through 220-P of system 200 and receiver 222-$k$ is an arbitrary one of receivers 222-1 through 222-K. As shown in FIG. 2C, the output signals from receiver input buffer 224, Z(t), is received in each of receivers 222-1 through 222-K. Therefore, in FIG. 5, demodulator 222-$k$ receives input signal Z(t).

Signal Z(t) is received in multipliers 501 and 502 where it is down-converted to baseband to obtain an in-phase component $r_k^I(t)$ and a quadrature component $r_k^Q(t)$. Multiplier 501 multiplies signal Z(t) with $\cos(2\pi \hat{f}_k t)$ and multiplier 502 multiplies signal Z(t) with $\sin(2\pi \hat{f}_k t)$, where $\hat{f}_k$ can be the locally generated estimate of the carrier center frequency $f_k$ from the corresponding transmitter 210-$k$. The clock signals within component 201-$p$, an arbitrary one of components 201-1 through 201-P, which are generated based on the reference signal from PLL 230 as shown in FIG. 2A, will have the same frequencies. However, the frequencies between differing ones of components 201-1 through 201-P can be slightly different. Therefore, $\{f_k\}$ denotes the set of frequencies at the transmitter and $\{\hat{f}_k\}$ denotes the set of frequencies at the receiver.

As shown in FIG. 5, PLL 523 generates the clock signals for receiver 222-$k$ and also generates the $\sin(2\pi \hat{f}_k t)$, signal. The $\cos(2\pi \hat{f}_k t)$ signal can be generated by $\pi/2$ phase shifter 524. PLL 523 generates the sampling clock signal utilized in analog to digital converters (ADCs) 506 and 507 as well as automatic gain control circuit (AGC) 520 based on the reference clock signal. PLL 523 also generates an RX CLK signal for output with the $n_k$ bit output signal from receiver 222-$k$. PLL 523 can be a free-running loop generating clock signals for receiver 222-$k$ based on the reference clock signal. In some embodiments transmitter 212-$k$ of transmitter and demodulator 222-$k$ of the receiver system 220-$p$, because they are part of different ones of components 201-1 through 201-P, are running off different clock signals. This means that the digital PLLs for timing recovery and carrier recovery correct both phase and frequency offsets between the transmitter clock signals and receiver clock signals.

In some embodiments, the output signals from multipliers 501 and 502 are input to offsets 530 and 531, respectively. DC offsets 530 and 531 provide a DC offset for each of the outputs of multipliers 501 and 502 to correct for any leakage onto signal Z(t) from the sine and cosine signals provided by PLL 523. Leakage onto Z(t) can, in some cases, provide a significant DC signal component of the output signals from mixers 501 and 502. In some embodiments, offsets 530 and 531 can offset by the same amount. In some embodiments, different offset values, DCOI and DCOQ in FIG. 5, can be provided for each of the output signals from multipliers 501 and 502. The DC offset values can be adaptively chosen in blocks 543 and 544. In some embodiments, after an initial start-up procedure, the DC offset values are fixed.

In some embodiments, the DC offsets, DCOI and DCOQ inputs to offsets 530 and 531, respectively, can be generated by providing a low frequency integration of the output signal from analog-to-digital converters (ADCs) 506 and 507. In FIG. 5, for example, low-frequency integrator 543 receives the output signal from of ADC 506 and provides the DCOI input signal to offset 530; integrator 544 receives the output signal from ADC 507 and provides the DCOQ input signal to offset 531. The low frequency integration of integrators 544 and 543 provides signals that set the average output signal of each of ADCs 506 and 507 to zero. In some embodiments of the invention, integrators 543 and 544 hold the offset values DCOI and DCOQ, respectively, constant after a set period time of integration when receiver 222-$k$ is first started.

The output signals from multipliers 501 and 502, or from offsets 530 and 531 in embodiments with offsets, can be input to low-pass filters 504 and 505. Low-pass filters 504 and 505 are analog filters that filter out signals not associated with the baseband signal (i.e., signals from the remaining bands of transmitter 210-$p$) for the kth transmission band.

Filters 504 and 505 again, in some embodiments, can again be parameterized by the two-zero, five-pole filter design described by Equation 2, $$H_{RX}(s) = \frac{b_2 s^2 + b_1 s + b_0}{s^5 + a_4 s^4 + \ldots + a_0} \quad (10)$$

Furthermore, the parameters $b_2$, $b_1$, $b_0$, and $a_4$ through $a_0$ can be found by minimizing the cost function $$\int_0^\infty |H_{RX}(s) - H_{RRC}(f)e^{-j2\pi f\tau}|^2 W(f) df. \quad (11)$$

The cost function is minimized with respect to the parameters of the filter and the time delay $\tau$. Again in Equation 11, the weighting function W(f) can be chosen such that the stop band rejection of $H_{RX}(s)$ is less than $-50$ dB. Furthermore, the function $H_{RRC}(f)$ the square root raised cosine function shown in FIG. 6E. As shown in FIG. 6E, the function $H_{RRC}(f)$ is characterized by a parameter $\alpha_k$ and baud frequency $1/T_k$. The parameter $\alpha_k$ is the excess bandwidth of the target function $H_{RRC}(f)$. In some embodiments, $\alpha_k$ can be 0. In some embodiments, $\alpha_k$ can be 0.6. In general, the parameter $\alpha_k$ can be any value, with smaller values providing better filtering but larger values being easier to implement. The parameter $T_k$ is related to the baud rate, $T_k = 1/B_k$.

In some embodiments of the invention, filters 504 and 505 can be determined by minimizing the function $$\int_0^\infty |H_{DAC}(f)H_{TX}(s)H_{RX}(s) - H_{RC}(f)e^{-j\pi f\tau}|^2 W(f) df, \quad (12)$$

where the function $H_{RC}(f)$ is a raised cosine function. The function $H_{RC}(f)$ is characterized by the parameters $\alpha_k$ and $1/T_k$. Equation 12 includes the effects of the transmit digital to analog converters 406 and 407 (FIG. 4) as well as the analog transmit filters 408 and 409 (FIG. 4) to set the overall response of filters 408 and 409, filters 504 and 505, and transmitter digital to analog converters 406 and 407 to the target response function $H_{RC}(f)$. In some embodiments, $H_{TX}(f)$ and $H_{RX}(f)$ can be the same.

Figure 8A:
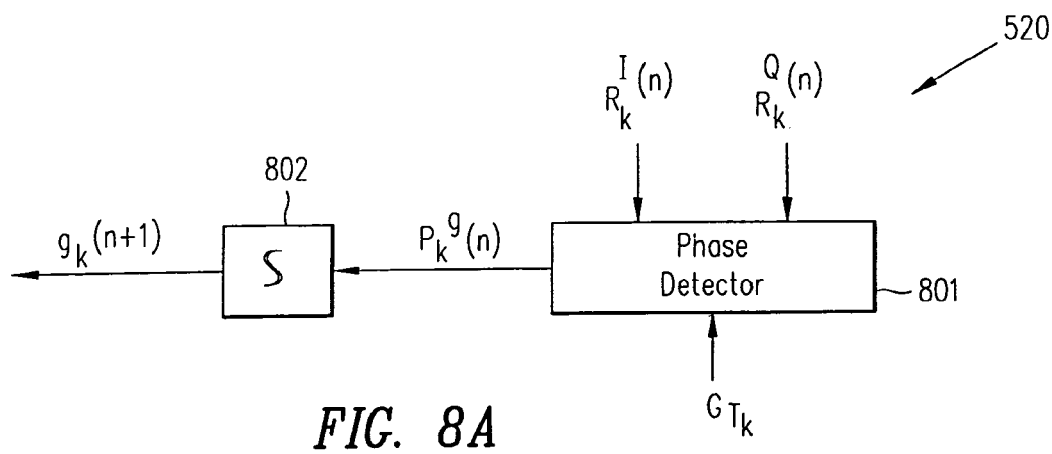
FIGS. 8A and 8B show a block diagram of an embodiment of an automatic gain control circuit of a receiver demodulator according to the present invention.
Figure 8B:
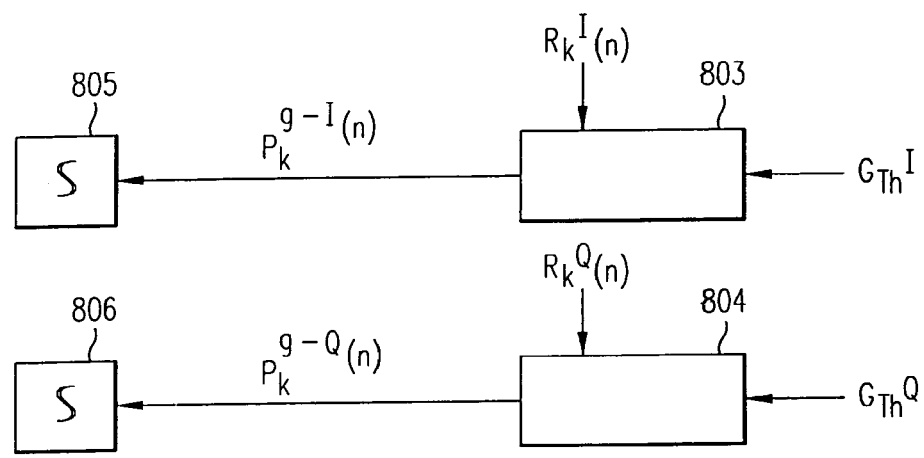

The output signals from low-pass filters 504 and 505 can, in some embodiments, be amplified in variable gain amplifiers 521 and 522, respectively. In some embodiments, the gains $gk^{1-I}$ and $gk^{1-Q}$ of amplifiers 521 and 522, respectively, is set such that the dynamic range of analog-to-digital converters 506 and 507, respectively, is filled. The output signals from amplifiers 521 and 522, then, are $$r_k^I(t) = \text{LPF}[Z(t)\cos h(2\pi \hat{f}_k \tau)]g_k^{1-I}$$

$$r_k^Q(t) = \text{LPF}[Z(t)\sin(2\pi \hat{f}_k t)]g_k^{1-Q}, \quad (13)$$

where $gk^{1-I}$ and $gk^{1-Q}$ represents the gain of amplifiers 521 and 522, respectively. The gains of amplifiers 521 and 522 can be set in an automatic gain control circuit (AGC) 520. An embodiment of automatic gain circuit 520 where $gk^{1-I}$ and $gk^{1-Q}$ are set equal to one another is shown in FIGS. 8A and 8B.

Signals $r_k^I(t)$ and $r_k^Q(t)$ are input to analog-to-digital converters (ADC) 506 and 507, respectively, which forms digitized signals $R_k^I(t)$ and $R_k^Q(t)$ corresponding with the analog signals $r_k^I(t)$ and $r_k^Q(t)$ respectively. In some embodiments, ADCs 506 and 507 operate at a sampling rate that is the same as the transmission symbol rate, e.g. the QAM symbol rate. In some embodiments, ADCs 506 and 507 can operate at higher rates, for example twice the QAM symbol rate. The timing clock signal SCLK, as well as the sine and cosine functions of Equation (13), is determined by PLL 523. In outputs with $\eta=10$, $K=8$, and $n_k=6$, as described above, ADCs 506 and 507 can operate at a rate of about 208 Msymbols/sec or, in embodiments with $K=16$, being about 104 Msymbols/sec. In some embodiments, ADCs 506 and 507 can be 8-bit ADCs. However, for 128 QAM operation, anything more than 7 bits can be utilized.

In some embodiments, the gain of amplifiers 521 and 522 can be set by automatic gain control circuit (AGC) 520. Gain control circuit 520 can receive the digital output signals from ADCs 506 and 507, $R_k^I(n)$ and $R_k^Q(n)$, respectively, and determines the gain $g^I k(n+1)$ for each of amplifiers 521 and 522 (i.e., $g^{1-I} k(n)$ and $g^{1-Q} k(n)$ are equal). FIGS. 8A and 8B show some embodiments of AGC 520. The embodiment of AGC 520 shown in FIG. 8A includes an AGC phase detector 801 and an integrator 802. Phase detector 801 estimates whether or not the mean-squared-power of signals $R_k^I(t)$ and $R_k^Q(t)$ are at a pre-determined threshold value and, if not, provides a correction signal to adjust the amplitudes of signals $r_k^I(t)$ and $r_k^Q(t)$. The output signal from phase detector 801 can be given by $$p_k^g(n) = [G_{th} - (R_k^I(n)^2 + R_k^Q(n)^2)], \quad (14)$$

where $G_{th}$ is the mean squared power of the signals input to ADCs 506 and 507 once AGC 520 converges. The output signal from phase detector 801, $p_k^g(n)$, is then input to integrator 802. Integrator 802 digitally adjusts the gain $g_k$ according to $$g_k^1(n+1) = g_k^1(n) + \alpha_g p_k^g(n), \quad (15)$$

where $\alpha_g$, determines the rate of adaptation of the AGC algorithm. The constant $\alpha_g$, can be chosen to be a negative power of 2 for ease of implementation.

The embodiment of phase detector 520 shown in FIG. 8B includes two phase detectors 803 and 804 which calculate the mean squared powers of $R_k^I(n)$ and $R_k^Q(n)$ separately and compare them with thresholds $G_{th}^I$ and $G_{th}^Q$, respectively. The output signals from phase detectors 803 and 804 can be given by $$p_k^{g-I}(n) = [G_{th}^I - (R_k^I(N)^2)]$$

$$p_k^{g-Q}(n) = [G_{th}^Q - (R_k^Q(N)^2)], \quad (16)$$

respectively. The output signals from detectors 803 and 804 can then be integrated in integrators 805 and 806 according to the $$g_k^{1-I}(n+1) = g_k^{1-I}(n) + \alpha_g^I p_k^{g-I}(n), \text{ and}$$

$$g_k^{1-Q}(n+1) = g_k^{1-Q}(n) + \alpha_g^Q p_k^{g-Q}(n), \quad (17)$$

where a, $\alpha_g^I$ and $a_g^Q$ determine the rate of adaptation of the AGC algorithm as in Equation 15 above.

In some embodiments AGC 520 can include a peak detection algorithm so that the gain values $g_k^{1-I}$ and $g_k^{1-Q}$ are determined from the peak values of $R_k^I$ and $R_k^Q$, respectively. Again, the peak values of $R_k^I$ and $R_k^Q$ can be compared with threshold values and the gain values $g_k^{1-I}$ and $g_k^{1-Q}$ adjusted accordingly.

In some embodiments of the invention, the in-phase and quadrature data paths may suffer from small differences in phase and small differences in gain. Therefore, in some embodiments a phase and amplitude correction is included. In order to correct the phase and amplitude between the in-phase and quadrature data paths, one of the values $R_k^I(n)$ and $R_k^Q(n)$ is assumed to be of the correct phase and amplitude. The opposite value is then corrected. In the embodiment shown in FIG. 5, $R_k^I(n)$ is assumed to be correct and $R_k^Q(n)$ is corrected. The phase error can be corrected by using the approximation for small $\theta_c$ where $\sin \theta_c$ is approximately $\theta_c$, and $\cos \theta_c$ is approximately one. This correction can be implemented by subtracting in summer 536 the value $\theta_c R_k^I(n)$ calculated in multiplier 535 to $R_k^Q(n)$. The amplitude of $R_k^Q(n)$ can be corrected by adding a small portion $\xi$ of $R_k^Q(n)$, calculated in multiplier 533, in summer 536. The value $\xi$ can be determined in tracking and recovery block 517 by integrating the difference in magnitude of the output signals from summer 534 and 536, $F_k^I(n)$ and $F_k^Q(n)$ in a very low frequency integration block (for example several kHz), such that $$\xi = \int (|F_k^I(n)| - |F_k^Q(n)|) dn. \quad (18)$$

The value $\theta_c$ can be chosen in tracking and recovery block 517 by $$\theta_c = \int (\text{sign}(F_k^I(n)) F_k^Q(n) + \text{sign}(F_k^Q(n)) F_k^I(n)) dn. \quad (19)$$

Additionally, an arithmetic offset can be implemented by subtracting the value $OFFSET_1^I$ in summer 534 to $R_k^I(n)$ and subtracting the value $OFFSET_1^Q$ in summer 536. The offset values $OFFSET_1^I$ and $OFFSET_1^Q$ can be adaptively chosen in tracking and recovery block 517 by integrating the output signals from summer 534 and summer 536, $F_k^I(n)$ and $F_k^Q(n)$, respectively, in a low frequency integration. The offsets implemented in summer 534 and 536 offset the dc offset not corrected by offsets 530 and 531, respectively, as well as arithmetic errors in summers 534, 536 and multipliers 535 and 533.

The output signals from summers 534 and 536, then, and given by $$F_k^I(n) = R_k^I(n) - OFFSET_1^I, \text{ and}$$

$$F_k^I(n) = (1+\xi) R_k^Q(n) - \theta_c R_k^I(n) - OFFSET_1^Q. \quad (20)$$

In some embodiments, the parameters $OFFSET_1^I$, $OFFSET_1^Q$, $\xi$, and $\theta_c$ vary for each cycle n. Additionally, the parameters can be different for each of the k receivers 222-1 through 222-k.

The output signals from summers 534 and 536, $F_k^I(n)$ and $F_k^Q(n)$, respectively, are then input to a phase rotation circuit 512. Phase rotation 512 rotates signals $F_k^I(n)$ and $F_k^Q(n)$ according to the output of a carrier phase and frequency offset correction circuit, which depends on the difference between $\hat{f}_k$ and $f_k$, and the relative phase of the transmit mixers (multipliers 410 and 411) and the receive mixers (multipliers 501 and 502) and transmission channel 250 (FIG. 2A). The rotation angle $\hat{\theta}_k^I(n)$ is computed in carrier tracking and timing recovery block 517. The resultant output signals of carrier phase rotation circuit 512, $D_k^I(n)$ and $D_k^Q(n)$, are given by:

$$D_k^I(n) = F_k^I(n) \cos(\hat{\theta}_k^I(n)) + F_k^Q(n) \sin(\hat{\theta}_k^I(n))$$

$$D_k^Q(n) = F_k^Q(n) \cos(\hat{\theta}_k^I(n)) - F_k^I(n) \sin(\hat{\theta}_k^I(n)). \quad (21)$$

The output signals from rotation circuit 512, $D_k^I(n)$ and $D_k^Q(n)$, are then input to a complex adaptive equalizer 513 to counter the intersymbol interference caused by frequency dependent channel attenuation, and the reflections due to connectors and vias that exist in communication system 200 (which can be a backplane communication system, an inter-cabinet communication system, or a chip-to-chip communication system).

It should be noted that because of the frequency division multiplexing of data signals, as is accomplished in transmitter system 210-p and receiver system 220-p, the amount of equalization needed in any one of channels 301-1 through 301-K is minimal. In some embodiments, such as the 16-channel, 6 bit per channel, 10 Gbps example, only about 1-2 dB of transmission channel magnitude distortion needs to be equalized. In 8 channel embodiments, 3-4 dB of distortion needs to be equalized. In other words, the number of taps required in a transport function for equalizer 513 can be minimal (e.g., 1-4 complex taps) in embodiments of the present invention, which can simplify receiver 220-p considerably. In some embodiments of the invention, equalizer 513 can have any number of taps.

Complex Equalizer 513 can be either a linear equalizer (i.e., having a feed-forward section only) or a decision feed-back equalizer (i.e., having a feed-forward and a feedback portion). The coefficients of the equalizer transfer function are complex-valued and can be adaptive. Additionally, the feed-forward portion of an adaptive equalizer (either a linear equalizer or decision feed-back equalizer) can be preceded by a non-adaptive all-pole filter with transfer function $1/A(z)$. In one embodiment, the coefficients of $A(z)$, which can be found by a minimum mean squared error technique, can be real-valued, for example $$A(Z)=1.0+0.75Z^{-1}+0.0625Z^{-2}+0.0234375Z^{-3}+0.09375Z^{-4}, \quad (22)$$

which can be rewritten as $$A(Z) = 1 + 0.75Z^{-1} + \frac{1}{16}Z^{-2} + \left(\frac{1}{64} + \frac{1}{128}\right)Z^{-3} + \left(\frac{1}{16} + \frac{1}{32}\right)Z^{-4}. \quad (23)$$

The resulting transfer function $H(z)=1/A(z)$ can be implemented in a linear equalizer or a decision feedback equalizer. In some embodiments, however, complex adaptive equalizer 513 includes adaptively chosen parameters.

In general, complex adaptive equalizer 513 can be a decision feedback equalizer (DFE) or a linear equalizer. See, e.g., EDWARD A. LEE, AND DAVID G. MESSERSCHMITT, DIGITAL COMMUNICATION, pp. 371-402 (Kluwer Academic Publishers, 1988). The in-phase and quadrature output signals from adaptive equalizer 513 in embodiments with linear equalization can be given by:

$$E_k^I(n) = \sum_{j=-M}^{N} C_k^x(j)D_k^I(n-j) - C_k^y(j)D_k^Q(n-j) \quad (24)$$

and $$E_k^Q(n) = \sum_{j=-M}^{N} C_k^x(j)D_k^Q(n-j) + C_k^y(j)D_k^I(n-j).$$

The complex adaptive equalizer coefficients $C_k^x(j)$ and $C_k^y(j)$ can be updated according to the least mean squares (LMS) algorithm as described in BERNARD SKLAR, DIGITAL COMMUNICATIONS, FUNDAMENTALS AND APPLICATIONS (Prentice-Hall, Inc., 1988), for example.

In some embodiments of the invention, the center coefficient of the feed-forward part of equalizer 513, $C_k^x(0)$ and $C_k^y(0)$, can be fixed at 1 and 0, respectively, to avoid interaction with the adaptation of gain coefficients $g_k^{2-I}$ and $g_k^{2-Q}$ used in amplifiers 537 and 538 and the carrier phase correction performed in phase rotator 512. Additionally, in some embodiments the coefficients $C_k^x(-1)$ and $C_k^y(-1)$ can be fixed at constant values to avoid interaction with the adaptation of the phase parameter $\widehat{\tau_k}$, by tracking and timing recovery 517. For example, the parameter $C_k^x(-1)$ can be $-\frac{1}{4}-\frac{1}{16}$, which is $-0.3125$, and the parameter $C_k^y(-1)$ can be $-\frac{1}{64}$, which is $-0.015625$.

The output signals from equalizer 513, $E_k^I(n)$ and $E_k^Q(n)$, are input to AGC controlled amplifiers 537 and 538, respectively. The gains of amplifiers 537 and 538 yield appropriate levels for the symbol set. The gain values $g_k^{2-I}$ and $g_k^{2-Q}$ are set in tracking and timing recovery 517 and can be determined in much the same fashion as in AGC 520. In the embodiment shown in FIG. 7, the gain values $g_k^{2-I}$ and $g_k^{2-Q}$ are determined based on the sign of the determined symbol from decision unit 516 and the error signal. These calculations are discussed further below.

The output signals from amplifiers 537 and 538 are input to quadrature correction 540. Quadrature correction 540 corrects for the phase error between the in-phase and quadrature mixers at the transmitter. The angle $\hat{\theta}_k^{(2)}(n)$ of the phase error can be adaptively chosen in tracking and timing recovery 517. The value $\hat{\theta}_k^{(2)}(n)$ can be changed very slowly and can be almost constant.

Figure 7:
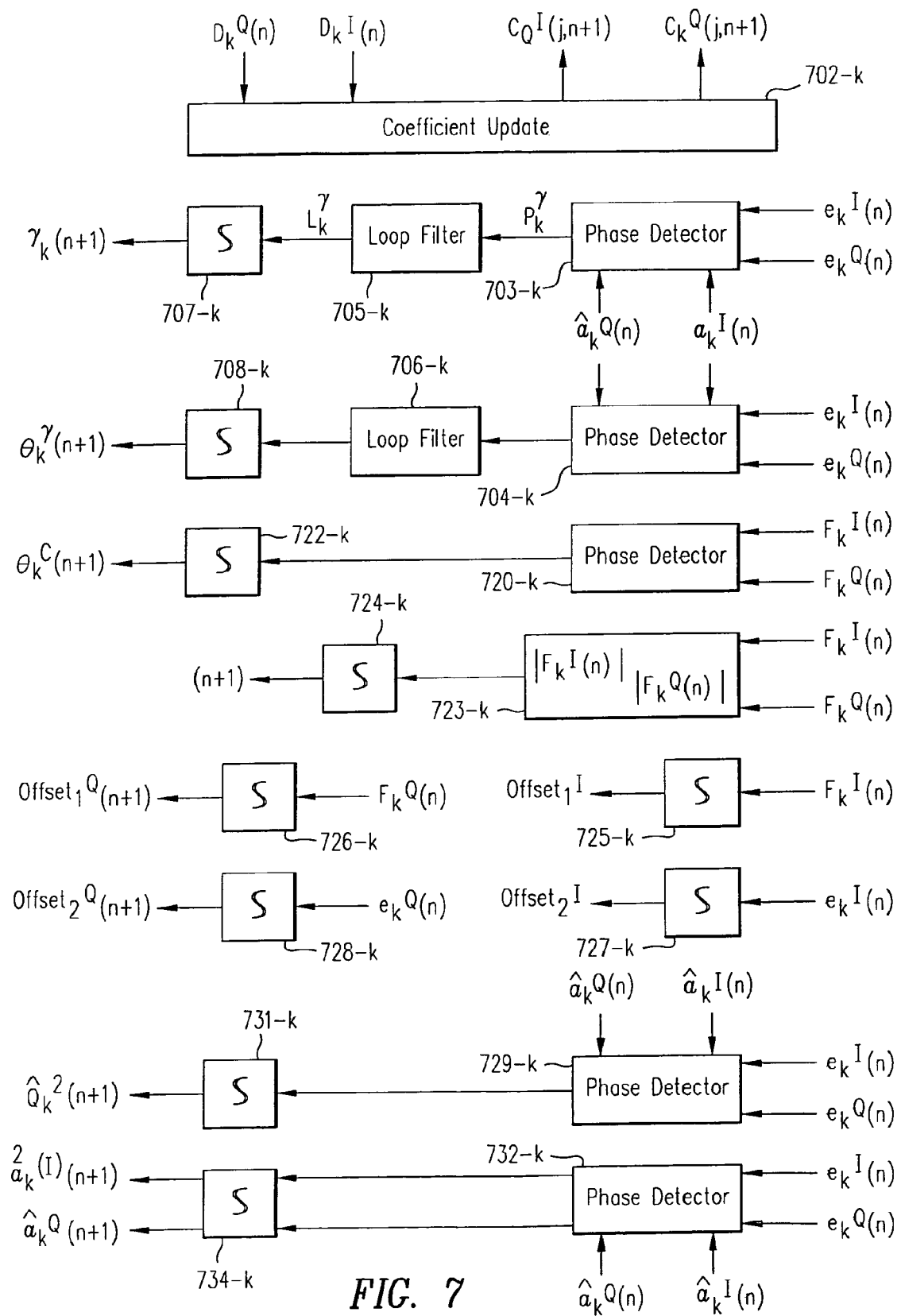
FIG. 7 shows a block diagram of an embodiment of a tracking and error-recovery circuit of the receiver shown in FIG. 5.

Additionally, arithmetic offsets $\text{OFFSET}_2^I$ and $\text{OFFSET}_2^Q$ can be subtracted in summers 541 and 542. The values of $\text{OFFSET}_2^I$ and $\text{OFFSET}_2^Q$ can be adaptively chosen in tracking and timing recovery 517. In some embodiments, the $\text{OFFSET}_2^I$ and $\text{OFFSET}_2^Q$ can be set by integrating the output signals of summers 541 and 542, $G_k^I(n)$ and $G_k^Q(n)$, respectively. Alternatively, as shown in FIG. 7, $\text{OFFSET}_2^I$ and $\text{OFFSET}_2^Q$ can be set such that the error at decision unit 516 is zero. In that embodiment, data dependent jitter can be reduced. In some embodiments, tracking and timing recovery 517 integrates the error values between the output samples from decision unit 516 and the output signals $G_k^I(n)$ and $G_k^Q(n)$ to minimize the error values.

The output signals $G_k^I(n)$ and $G_k^Q(n)$, then, are given by $$G_k^I(n)=g_k^{2-I}E_k^I(n)-\text{OFFSET}_2^I$$

$$G_k^Q(n)=g_k^{2-Q}E_k^Q(n)-g_k^{2-I}E_k^I(n)\hat{\theta}_k^{(2)}-\text{OFFSET}_2^Q. \quad (25)$$

FIG. 7 shows an example of Tracking and Timing Recovery 517. Tracking and timing recovery 517 inputs decision values $\hat{\alpha}_k^I(n)$ and $\hat{\alpha}_k^Q(n)$, which are decisions of the symbol values based on the signals $G_k^I(n)$ and $G_k^Q(n)$ in decision unit 516. Error calculation block 701 calculates errors $e_k^I(n)$ and $e_k^Q(n)$ based on the decided values $\hat{\alpha}_k^I(n)$ and $\hat{\alpha}_k^Q(n)$ and the values $G_k^I(n)$ and $G_k^Q(n)$. The coefficients of equalizer 513 are computed in coefficient update 702.

The coefficients of Equalizer 513 are updated in tracking and timing recovery block 517, for example, according to the following update equations:

$$C_k^x(n+1)=C_k^x(n)-\mu[e_k^I(n)D_k^I(n)+e_k^Q(n)D_k^Q(n)] \text{ and}$$

$$C_k^y(n+1)=C_k^y(n)-\mu[e_k^Q(n)D_k^I(n)-e_k^I(n)D_k^Q(n)], \quad (26)$$

where $\mu$ is the constant that determines the rate of adaptation of the coefficients, and $e_k^I(n)$ and $e_k^Q(n)$ are estimated error values, The constant $\mu$ is chosen to control the rate of adaptation, and, in some embodiments, is in the range of $2^{-8}$ to $2^{-14}$. In some embodiments, the coefficient $\mu$ can be different for the update equation for $C_k^x$ and the update equation for $C_k^y$. The estimated error values can be computed according to:

$$e_k^I(n)=G_k^I(n)-\hat{\alpha}_k^I(n) \text{ and}$$

$$e_k^Q(n)=G_k^Q(n)-\hat{\alpha}_k^Q(n), \quad (27)$$

where $G_k^I(n)$ and $G_k^Q(n)$ are corrected values of $E_k^I(n)$ and $E_k^Q(n)$, respectively, and $\{\hat{\alpha}_k^I(n), \hat{\alpha}_k^Q(n)\}$ is the decision set based on the sample set $\{G_k^I(n), G_k^Q(n)\}$, and represents the closest QAM symbol in Euclidean distance to the sample set. See, e.g., EDWARD A. LEE, AND DAVID G. MESSER-SCHMITT, DIGITAL COMMUNICATION. PP. 371-402 (Kluwer Academic Publishers, 1988). A decision set $\{\hat{\alpha}_k^I(n), \hat{\alpha}_k^Q(n)\}$ can be computed based on sample set $\{G_k^I(n), G_k^Q(n)\}$ in decision unit 516 and the results received into tracking and timing recovery circuit 517 where the estimated error values of Equation 27 and the resulting coefficient updates of Equation 26 are computed.

FIG. 7 shows a block diagram of equalizer coefficient update, carrier tracking and timing recovery block 517. Block 517 includes error calculation block 701 and coefficient update block 702. Error calculation block 701 receives decisions $\hat{\alpha}_k^I(n)$ and $\hat{\alpha}_k^Q(n)$ from decision unit 516 as well as sample set signals $G_k^I(n)$ and $G_k^Q(n)$ from complex adaptive equalizer 513 and calculates errors $e_k^I(n)$ and $e_k^Q(n)$ according to Equation 27. Coefficient update 702 receives errors $e_k^I(n)$ and $e_k^Q(n)$ from error calculation block 701 and also receives signals $D_k^I(n)$ and $D_k^Q(n)$ from phase rotator circuit 512 and calculates updated equalizer coefficients for complex adaptive equalizer 513 according to Equation 26.

Tracking and timing recovery circuit 517 can also include a carrier recovery loop for controlling carrier phase rotation circuit 512 and a timing recovery loop for controlling the phase of sampling clock signal SCLK from PLL 523. In some embodiments, the timing recovery loop for determining $\tau_k(n+1)$ in tracking and timing recovery 517 can be implemented as a $2^{nd}$ order digital phase locked loop as shown in FIG. 7.

The errors $e_k^I(n)$ and $e_k^Q(n)$ from error calculation block 701 and the decisions $\hat{\alpha}_k^I(n)$ and $\hat{\alpha}_k^Q(n)$ from decision unit 516 are input to phase detector 703. Phase detector 703 can produce an estimate of the phase error $pk^\tau$, in some embodiments according to the following equation:

$$p_k^\tau(n)=[e_k^I(n-1)\hat{\alpha}_k^I(n)-e_k^I(n)\hat{\alpha}_k^I(n-1)]+[e_k^Q(n-1)\hat{\alpha}_k^Q(n)-e_k^Q(n)\hat{\alpha}_k^Q(n-1)] \quad (28)$$

Alternatively, the phase error $pk^\tau$ can be calculated from $$p_k^\tau(n)=e_k^I(n-1)[\hat{\alpha}_k^I(n)-\hat{\alpha}_k^I(n-2)]+e_k^Q(n-1)[\hat{\alpha}_k^Q(n)-\hat{\alpha}_k^Q(n-2)], \quad (29)$$

which can be simpler to implement than Equation 28.

The output signal from phase detector 703, $pk^\tau$, can then be input to a $2^{nd}$ order loop filter, which in some embodiments can have a transfer function given by $$L(z) = \alpha_\tau + \beta_\tau \frac{z^{-1}}{1-z^{-1}}$$

where $\alpha_\tau$ and $\beta_\tau$ are the loop filter coefficients that determine the timing recovery loop bandwidth and damping factor. In some embodiments, a loop bandwidth equal to 1% of baud rate, and damping factor equal to 1 can be implemented. The loop bandwidth and damping factors can depend not only on loop filter coefficients, but also on phase detector slope, and the digital integrator gain. Thus, the output signal $L_k^\tau(n)$ from loop filter 705 is given by $$L_k^\tau(n)=\alpha_\tau p_k^\tau(n)+I_k^\tau(n), \text{ where}$$

$$I_k^\tau(n)=I_k^\tau(n-1)+\beta_\tau p_k^\tau(n-1). \quad (31)$$

The output signal from loop filter 705, $L_k^\tau(n)$, is then input to a digitally implemented integrator 707, the output of which is the phase correction $\hat{\tau}_k(n)$ given by $$\hat{\tau}_k(n+1)=\hat{\tau}_k(n)+L_k^\tau(n). \quad (32)$$

The phase correction $\hat{\tau}_k(n)$ is then received by PLL 523, as described above.

The carrier phase recovery loop which computes the parameter $\hat{\theta}$ utilized in phase rotation 517 can also be implemented as a $2^{nd}$ order digital phase locked loop as shown in FIG. 7. Phase detector 704 receives decision values $\{\hat{\alpha}_k^I(n), \hat{\alpha}_k^Q(n)\}$ from decision unit 516 and error signals $\{e_k^I(n), e_k^Q(n)\}$ from error calculation 701, and produces an estimate of the phase error. In some embodiments, the estimate of the phase error $p_k^\theta(n)$ performed by phase detector 704 can be given by:

$$p_k^\theta(n) = [e_k^Q(n) \text{ sign}\{\hat{\alpha}_k^I(n)\} - e_k^I(n) \text{ sign}\{\hat{\alpha}_k^Q(n)\}], \quad (33)$$

where $$\text{sign}(x) = \begin{cases} 1 & \text{if } x \geq 0 \\ -1 & \text{if } x < 0. \end{cases} \quad (34)$$

The output signal from phase detector 704 can be input to a $2^{nd}$ order loop filter 706 with a transfer function given by $$L(z) = \alpha_\theta + \beta_\theta \frac{z^{-1}}{1-z^{-1}}, \quad (35)$$

where $\alpha_\theta$ and $\beta_\theta$ are the loop filter coefficients that determine the carrier tracking loop bandwidth and the damping factor. Thus, the output signal from loop filter 706 is given by $$L_k^\theta(n)=\alpha_\theta p_k^\theta(n)+I_k^\theta(n), \text{ where}$$

$$I_k^\theta(n)=I_k^\theta(n-1)+\beta_\theta p_k^\theta(n-1). \quad (36)$$

The output signal from loop filter 706 is then input to a digitally implemented integrator 708. The output signal from integrator 708, $\hat{\theta}_k(n+1)$, is then given by $$\hat{\theta}_k(n+1)=\hat{\theta}_k(n)+L_k^\theta(n). \quad (37)$$

The carrier tracking loop output signal $\hat{\theta}_k(n)$, output from integrator 708, is then input to phase rotation circuit 512.

Further, as shown in FIG. 7, the parameter $\theta_c(n+1)$ can be calculated as shown in phase detector 720 and integrator 722 as described in Equation 19. As described above, the parameter $\xi(n+1)$ is calculated by calculated in blocks 723 and integration block 724 according to Equation 18.

As shown in Blocks 725 and 726, the offset values OFFSET1$^I$ and OFFSET1$^Q$ can be determined by integrating $F_k^I(n)$ and $F_k^Q(n)$, respectively. Similarly, the offset values OFFSET2$^I$ and OFFSET2$^Q$ can be calculated by integrating the signals $G_k^I(n)$ and $G_k^Q(n)$, respectively. The embodiment shown in FIG. 7 shows OFFSET2$^I$ and OFFSET2$^Q$ calculated by integrating the error signals $e_k^I(n)$ and $e_k^Q(n)$, respectively.

Further, the coefficient $\hat{\theta}_k^{(2)}$ to quadrature correction 540 is calculated by phase detector 729 and integrator 731. The output signal from phase detector 729 can be calculated by $$P_k^{\theta 2}=-\text{sign}(\hat{\alpha}_k^I(n))e_k^Q(n)-\text{sign}(\hat{\alpha}_k^Q(n))e_k^I(n) \quad (38)$$

The output signal from integrator 731, then, can be given by $$\theta_k^{(2)}(n+1)=\theta_k^{(2)}(n)+\alpha_\theta P_k^{\theta 2} \quad (39)$$

The gains $g_k^{2-I}$ and $g_k^{2-Q}$ can be calculated by phase detector 732 and integrator 734. In some embodiments, phase detector 732 calculates the quantities $$p_k^{g2-I}(n)=-e_k^I(n)\text{sign}(\hat{\alpha}_k^I(n)) \text{ and}$$

$$p_k^{g2-Q}(n)=-e_k^Q(n)\text{sign}(\hat{\alpha}_k^Q(n)). \quad (40)$$

The output signals from integrator 734, then, can be given by $$g_k^{2-I}(n+1)=g_k^{2-I}(n)+\alpha_g p_k^{g2-I} \text{ and}$$

$$g_k^{2-Q}(n+1)=g_k^{2-Q}(n)+\alpha_g p_k^{g2-Q}, \quad (41)$$

where $\alpha_g$ determines how fast the gain values respond to changes.

As shown in FIG. 5, the output signals from offset corrections 541 and 542, equalized samples $\{G_k^I(n), G_k^Q(n)\}$, are input to trellis decoder 514. Trellis decoding can be performed using the Viterbi algorithm, see, e.g., G. Ungerboeck., "Channel Coding with Multilevel/Phase Signals," IEEE Transactions on Information Theory, vol. IT-28, January 1982, pp. 55-67, G. Ungerboeck., "Trellis Coding Modulation with Redundant Signal Sets, Part I. Introduction," IEEE Communications Magazine, vol. 25, no. 2, February 1987, pp. 5-11, G. Ungerboeck., "Trellis Coding Modulation with Redundant Signal Sets, Part II. State of the Art," IEEE Communications Magazine, vol. 25, no. 2, February 1987, pp. 12-21, or G. C. CLARK, JR., AND J. B. CAIN, ERROR CORRECTION CODING FOR DIGITAL COMMUNICATIONS, PP. 253-264 (Plenum Press, New York, 1981). Additionally, trellis decoder 514 converts from the QAM symbol set back to parallel bits. The output signal from trellis decoder 514, which now contains $n_k$ parallel bits, is input to descrambler 515. Descrambler 515 of receiver demodulator 222-$k$ operates to reverse the scrambling operation of scrambler 401 of transmitter modulator 212-$k$.

As is shown in FIG. 2C, the output signals from each of demodulators 222-1 through 222-K are recombined into an N-bit parallel signal in bit parsing 221. Additionally, the RX clock signal is output from bit parsing 221.

Figure 10A:
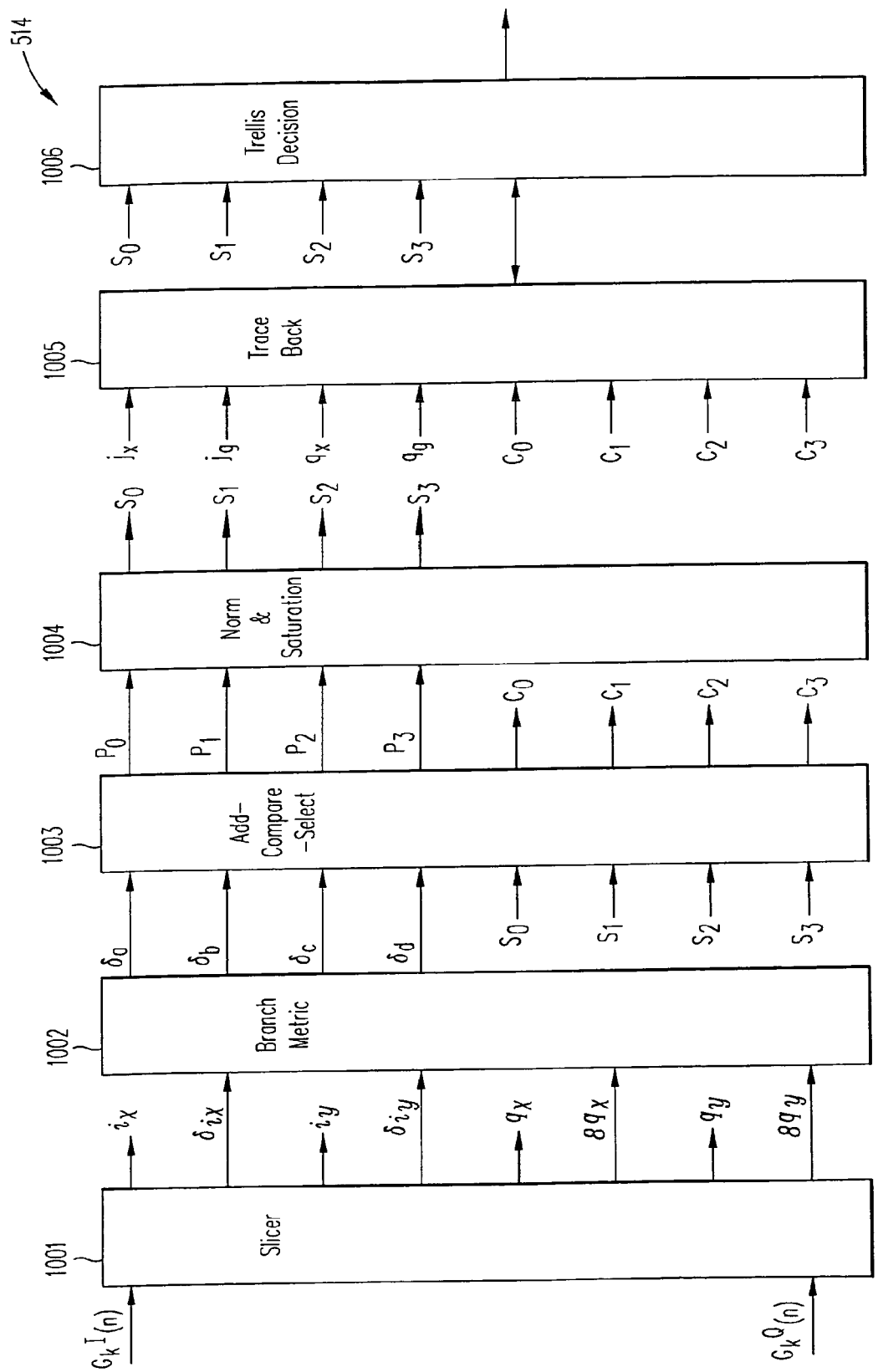

FIG. 10 shows an example embodiment of trellis decoder 514 according to the present invention. Trellis decoder 514 of FIG. 10A includes a slicer 1001, a branch metric 1002, an add-compare-select (ACS) block 1003, a normalization and saturation block 1004, a trace back 1005, and a trellis decision block 1006. The output signal from trellis decoder 514 is the received bits, which are substantially as transmitted by transmitter 210-$p$.

Slicer 1001 receives the output signals $G_k^I(n)$ and $G_k^Q(n)$ from offset blocks 541 and 542, respectively. FIG. 10B shows an embodiment of slicer 1001. The value $G_k^I(n)$ is received in x and y slicers 1010 and 1011, respectively. Slicer 1010 slices $G_k^I(n)$ to a first set of symbol values while slicer 1011 slices $G_k^I(n)$ to a second set of slicer values. For example, in a 128 QAM system as shown in Table I, x-slicer 1010 can slice to the symbol values −11, −7, −3, 1, 5, and 9 and y-slicer 1011 can slice to the symbol values −9, −5, −1, 3, 7, 11. In some embodiments, the number of bits can be reduced by mapping the decided symbols from slicers 1010 and 1011 using table 1016 and 1021, respectively. The output signal from tables 1016 and 1021, then, are $i_x$ and $i_y$, indicating decisions based on the input value $G_k^I(n)$.

TABLE II

| INPUT  | 0-8 | 9, 10 | 11, 12, 13 | >14 |
|--------|-----|-------|------------|-----|
| OUTPUT | 0   | 1     | 2          | 3   |

The errors $\delta i_x$ and $\delta i_y$ are also calculated. The output signals from slicers 1010 and 1011 are subtracted from the input signal $G_k^I(n)$ in summers 1015 and 1020, respectively. In some embodiments, the output signals from slicers 1010 and 1011 are input to blocks 1014 and 1019, respectively, before subtraction in summers 1015 and 1020. Blocks 1014 and 1019 represent shifts. In some embodiments, the input signals to slicers 1010 and 1011 are 8-bit signed numbers. The value 8 slices to a perfect 1. Similarly, the value −56 slices to a perfect −7. So if the input signal is a −56 it would be sliced to −7. To calculate the error, we need to multiply the −7 by 8 before it is subtracted from the incoming signal. Multiplying by 8 is the same as a shift to the left by 3.

The absolute values of the output signals from summers 1015 and 1020 are then taken by blocks 1017 and 1022, respectively. The output signal from ABS blocks 1017 and 1022 can be mapped into a set of values requiring a smaller number of bits by tables 1018 and 1023, as in Table II above, respectively, to generate $\delta i_x$ and $\delta i_y$, respectively.

The output signals corresponding to the quadrature data path, qx, qy, $\delta q_x$ and $\delta q_y$, are generated by substantially identical procedure by slicers 1012, 1013, summers 1025, 1030, and blocks 1024, 1026, 1027, 1028, 1029, 1031, 1032 and 1033.

Branch metric 1002 receives the error signals from slicer 1001 and calculates the signals $\delta a$, $\delta b$, $\delta c$, and $\delta d$. The branch metric values $\delta a$, $\delta b$, $\delta c$, and $\delta d$ indicate the path metric errors. In some embodiments, the path metric errors $\delta a$, $\delta b$, $\delta c$, and $\delta d$ can be calculated as $$\delta a = \delta i_x + \delta q_x,$$

$$\delta b = \delta i_y + \delta q_x,$$

$$\delta c = \delta i_x + \delta q_y,$$

$$\delta d = \delta i_y + \delta q_y.$$

Add-Compare Select 1003 receives the path metric $\delta a$, $\delta b$, $\delta c$, and $\delta d$ along with state metric values $s_0$, $s_1$, $s_2$ and $s_3$, which are calculated in normalization and saturation block 1004. In some embodiments, the output values of ACS 1003 include path metrics $p_0$, $p_1$, $p_2$ and $p_3$ along with choice indicators $c_0$, $c_1$, $c_2$ and $c_3$. The path metrics $p_0$, $p_1$, $p_2$ and $p_3$ can be given by $$p_0 = \text{MIN}(s_0 + \delta a, s_2 + \delta d),$$

$$p_1 = \text{MIN}(s_0 + \delta d, s_2 + \delta a),$$

$$p_2 = \text{MIN}(s_1 + \delta b, s_3 + \delta c), \text{ and}$$

$$p_3 = \text{MIN}(s_1 + \delta c, s_3 + \delta b).$$

The choice indicators $c_0$, $c_1$, $c_2$ and $c_3$ indicate which of the values was chosen in each of the minimization in Equation 43.

Normalization and saturation 1004 receives the path metrics $p_0$, $p_1$, $p_2$ and $p_3$ and calculates the state metrics $s_0$, $s_1$, $s_2$ and $s_3$. In some embodiments, if the path metrics are above a threshold value, the threshold value is subtracted from each of the path metrics. In some embodiments, the smallest path metric can be subtracted from each of the path metrics $p_0$, $p_1$, $p_2$ and $p_3$. Normalization and Saturation block 1004 also ensures that path metrics $p_0$, $p_1$, $p_2$ and $p_3$ are limited to a maximum value. For example, in an embodiment where $p_0$, $p_1$, $p_2$ and $p_3$ are a four-bit number (range 0-15), if $p_0$, $p_1$, $p_2$ or $p_3$ is greater than 15, then the corresponding path metric is limited to the maximum value of 15. Then, the state metrics for the next baud period, $s_0$, $s_1$, $s_2$, and $s_3$, are set to the path metrics $p_0$, $p_1$, $p_2$ and $p_3$.

Traceback 1005 receives and stores the choice indicators $c_0$, $c_1$, $c_2$ and $c_3$ as well as the decided values from slicer 1001 in that baud period, $i_x$, $i_y$, $q_x$, and $q_y$. The choice indicators $c_0$, $c_1$, $c_2$ and $c_3$ indicate the previous state values. As shown in the state transition diagram of FIG. 10C, which indicates state transitions between the encoded bits, for each of the states 0-3, there are only two possible previous states 0-3. For example, if the current state is 1, the previous state was either 0 or 2. Although any traceback depth can be utilized in traceback 1005, in some embodiments a traceback depth of 6 is utilized. With the use of mapping tables 1016, 1021, 1026 and 1031 reducing the number of bits required to store $i_x$, $i_y$, $q_x$, and $q_y$, (for example a total of 8 in 128 QAM systems) and the low number of bits required to store choice indicators $c_0$, $c_1$, $c_2$ and $c_3$, a low number of bits is needed. For example, in some embodiments a total of 12 bits is utilized.

For calculating the trellis output from trace back 1005, the most recently stored memory locations are utilized first with the first choice being the state with the lowest state metric. The algorithm then traces back through the stored choice indications $c_0$, $c_1$, $c_2$ and $c_3$ to the end of the traceback memory (in some embodiments, the sixth state) and arrives at state S. In the example trellis discussed above, the MSB of the output is the LSB of the state, S. The final state S and the choice indicator Cs will determine which pair of symbols were transmitted ($I_x/I_y$, $Q_x/Q_y$). By reading the values of these symbols from the traceback memory, a look-up in, for example, Table I will result in a read value. The five least significant bits of the read value from the look-up table, e.g. Table I, becomes the five least significant bits of the output signal. The most significant bit was determined earlier and supplies the most significant bit (MSB).

Figure 9:
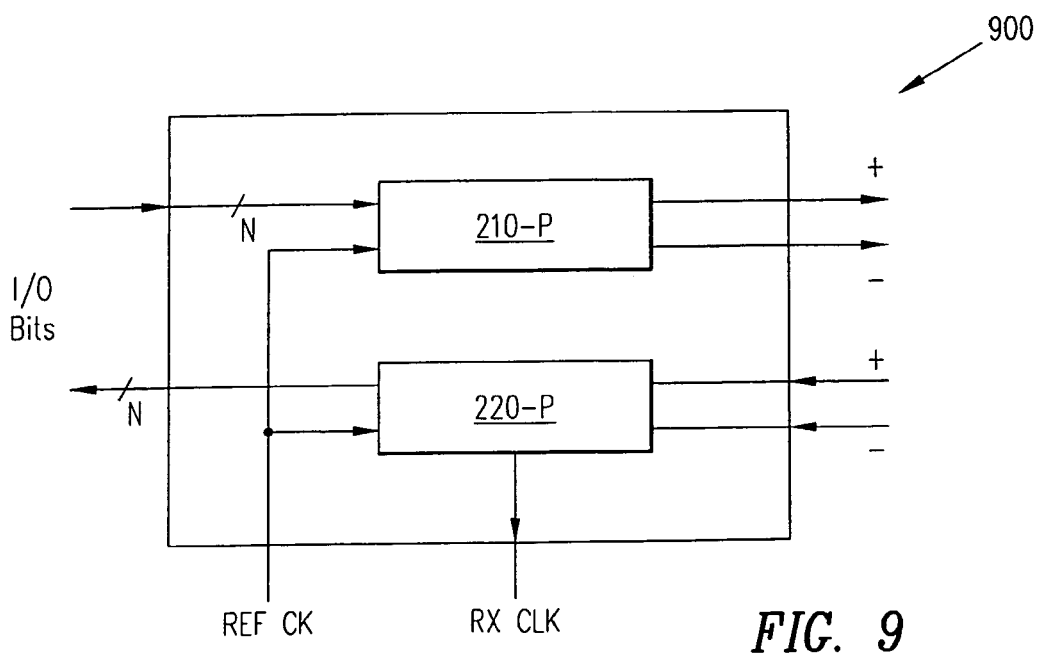
FIG. 9 shows a block diagram of a transceiver chip according to the present invention.

FIG. 9 shows a transceiver chip 900 according to the present invention. Transceiver chip 900 includes transmitter 210-*p* and receiver 220-*p* formed on a single semiconductor chip. In some embodiments, transceiver chip 900 is formed in silicon using CMOS technology. Transceiver chip 900 can receive N bits into transmitter 210-*p* and output N bits from receiver 220-*p*. In some embodiments, different pins may be utilized for input bits and output bits, as shown in FIG. 9. In some embodiments, transmitter 210-*p* and receiver 220-*p* share the same N pins. Transmitter 900 receives a reference clock signal and outputs a receive clock signal from receiver 220-*p*. Further, transceiver 220 includes output pins for transmitting and receiving differential signals. In some embodiments, transmitter 210-*p* and receiver 220-*p* share the same output pins and in some embodiments transmitter 210-*p* and receiver 220-*p* are coupled to separate output pins. In some embodiments, transceiver chip 900 may be coupled to an optical driver for optical transmission.

The embodiments of the invention described above are exemplary only and are not intended to be limiting. One skilled in the art will recognize various modifications to the embodiments disclosed that are intended to be within the scope and spirit of the present disclosure. As such, the invention is limited only by the following claims.

TABLE I

|     |     |    |     |    |     |    |     |    |     |    |     |     |
|-----|-----|----|-----|----|-----|----|-----|----|-----|----|-----|-----|
|     |     | 47 | 111 | 43 | 107 | 59 | 123 | 63 | 127 |    |     | 11  |
|     |     | 15 | 79  | 11 | 75  | 27 | 91  | 31 | 95  |    |     | 9   |
| 42  | 106 | 45 | 109 | 41 | 105 | 57 | 121 | 61 | 125 | 58 | 122 | 7   |
| 10  | 74  | 13 | 77  | 9  | 73  | 25 | 89  | 29 | 93  | 26 | 90  | 5   |
| 46  | 110 | 44 | 108 | 40 | 104 | 56 | 120 | 60 | 124 | 62 | 126 | 3   |
| 14  | 78  | 12 | 76  | 8  | 72  | 24 | 88  | 28 | 92  | 30 | 94  | 1   |
| 38  | 102 | 36 | 100 | 32 | 96  | 48 | 112 | 52 | 116 | 54 | 118 | −1  |
| 6   | 70  | 4  | 68  | 0  | 64  | 16 | 80  | 20 | 84  | 22 | 86  | −3  |
| 34  | 98  | 37 | 101 | 33 | 97  | 49 | 113 | 53 | 117 | 50 | 114 | −5  |
| 2   | 66  | 5  | 69  | 1  | 65  | 17 | 81  | 21 | 85  | 18 | 82  | −7  |
|     |     | 39 | 103 | 35 | 99  | 51 | 115 | 55 | 119 |    |     | −9  |
|     |     | 7  | 71  | 3  | 67  | 19 | 83  | 23 | 87  |    |     | −11 |
| −11 | −9  | −7 | −5  | −3 | −1  | 1  | 3   | 5  | 7   | 9  | 11  | I/Q |

We claim:

1. A transmission system, comprising:
a plurality of receivers, each of the plurality of receivers receiving signals from one of a plurality of transmission bands, at least one of the plurality of receivers comprising:
a down-converter that converts an input signal from the one of the plurality of transmission bands to a base band, the down-converter creating an in-phase signal and a quadrature signal, the in-phase signal being the input signal multiplied by a cosine function at the frequency of the one of the plurality of transmission bands and the quadrature signal being the input signal multiplied by a sine function at the frequency of the one of the plurality of transmission bands;
a filter coupled to receive signals from the down-converter, the filter substantially filtering out signals not in the base band and including an in-phase filter filtering the in-phase signal and a quadrature filter filtering the quadrature signal;
an analog-to-digital converter coupled to receive signals from the filter and generate digitized signals;
an equalizer coupled to receive the digitized signals; and
a trellis decoder coupled to receive signals from the equalizer and generate recreated data, the recreated data being substantially the same data transmitted by a corresponding transmitter, and
an offset block coupled between the down-converter and the filter, the offset block offsetting the in-phase signal and the quadrature signal such that signals output from the analog-to-digital converter averages zero.

2. A transmission system, comprising:
a plurality of receivers, each of the plurality of receivers receiving signals from one of a plurality of transmission bands, at least one of the plurality of receivers comprising:
a down-converter that converts an input signal from the one of the plurality of transmission bands to a base band, the down-converter creating an in-phase signal and a quadrature signal, the in-phase signal being the input signal multiplied by a cosine function at the frequency of the one of the plurality of transmission bands and the quadrature signal being the input signal multiplied by a sine function at the frequency of the one of the plurality of transmission bands;
a filter coupled to receive the in-phase and the quadrature signals from the down-converter, the filter substantially filtering out signals not in the base band and including an in-phase filter filtering the in-phase signal and a quadrature filter filtering the quadrature signal;
an analog-to-digital converter coupled to receive signals from the filter and generate digitized signals;
an amplifier coupled between the filter and the analog-to-digital converter, the amplifier amplifying an in-phase filtered signal from the in-phase filter and a quadrature filter signal from the quadrature filter such that the analog-to-digital converter is filled;
an equalizer coupled to receive the digitized signals; and
a trellis decoder coupled to receive signals from the equalizer and generate recreated data, the recreated data being substantially the same data transmitted by a corresponding transmitter,
wherein an in-phase gain of the amplifier and a quadrature gain of the amplifier are adaptively chosen in an automatic gain controller.

3. The system of claim 2, wherein the automatic gain controller sets the in-phase gain and the quadrature gain based on the digitized signals from the analog to digital converters.

4. The system of claim 3, wherein the in-phase gain and the quadrature gain are equal.

5. A transmission system, comprising:
a plurality of receivers, each of the plurality of receivers receiving signals from one of a plurality of transmission bands, at least one of the plurality of receivers comprising:
a down-converter that converts an input signal from the one of the plurality of transmission bands to a base band, the down-converter creating an in-phase signal and a quadrature signal, the in-phase signal being the input signal multiplied by a cosine function at the frequency of the one of the plurality of transmission bands and the quadrature signal being the input signal multiplied by a sine function at the frequency of the one of the plurality of transmission bands;
a filter coupled to receive signals from the down-converter, the filter substantially filtering out signals not in the base band and including an in-phase filter filtering the in-phase signal and a quadrature filter filtering the quadrature signal;
an analog-to-digital converter coupled to receive signals from the filter and generate digitized signals, the analog-to-digital converter including a first analog-to-digital converter coupled to receive signals from the in-phase filter and a second analog-to-digital converter coupled to receive signals from the quadrature filter;
an equalizer coupled to receive the digitized signals;
a correction circuit coupled between the analog-to-digital converter and the equalizer, the correction circuit including an adjustment to correct phases between the in-phase signal and the quadrature signal; and
a trellis decoder coupled to receive signals from the equalizer and generate recreated data, the recreated data being substantially the same data transmitted by a corresponding transmitter,
wherein a small portion of one of the in-phase signal and the quadrature signal are added to the opposite one of the in-phase signal and the quadrature signal.

6. The system of claim 5, wherein a second portion of the opposite one of the in-phase signal and the quadrature signal is added to the opposite one of the in-phase signal and the quadrature signal.

7. The system of claim 6, wherein the small portion and the second portion are adaptively chosen.

8. The system of claim 7, wherein the small portion is a function of in-phase and quadrature output signals from the correction circuit.

9. The system of claim 7, wherein the second portion is a function of the ratio between in-phase and quadrature signals from the correction circuit.

10. The system of claim 5, wherein a phase rotator circuit is coupled between the analog-to-digital converter and the equalizer.

11. The system of claim 10, wherein a parameter of the phase rotator circuit is adaptively chosen.

12. A transmission system, comprising:
a plurality of receivers, each of the plurality of receivers receiving signals from one of a plurality of transmission bands, at least one of the plurality of receivers comprising:
a down-converter that converts an input signal from the one of the plurality of transmission bands to a base band, the down-converter creating an in-phase signal and a quadrature signal, the in-phase signal being the input signal multiplied by a cosine function at the frequency of the one of the plurality of transmission bands and the quadrature signal being the input signal multiplied by a sine function at the frequency of the one of the plurality of transmission bands;
a filter coupled to receive signals from the down-converter, the filter substantially filtering out signals not in the base band;
an analog-to-digital converter coupled to receive signals from the filter and generate digitized signals;
an equalizer coupled to receive the digitized signals;
a trellis decoder coupled to receive signals from the equalizer and generate recreated data, the recreated data being substantially the same data transmitted by a corresponding transmitter;
an amplifier coupled between the equalizer and the trellis decoder; and
a quadrature correction coupled between the amplifier and the trellis decoder.

13. The system of claim 12, wherein an offset circuit is coupled between the quadrature correction and the trellis decoder.

14. The system of claim 13, wherein a parameter of the offset circuit is adaptively chosen.

15. The system of claim 12, wherein an in-phase gain and a quadrature gain of the amplifier are adaptively chosen from error signals calculated from sliced values.

16. The system of claim 15, wherein the sliced values are determined from input signals to the trellis decoder.

17. The system of claim 12, wherein a parameter of the quadrature correction is adaptively chosen.

18. A transmission system comprising:
a plurality of receivers, each of the plurality of receivers receiving signals from one of a plurality of transmission bands, at least one of the plurality of receivers comprising:
a down-converter that converts an input signal from the one of the plurality of transmission bands to a base band, the down-converter creating an in-phase signal and a quadrature signal, the in-phase signal being the input signal multiplied by a cosine function at the frequency of the one of the plurality of transmission bands and the quadrature signal being the input signal multiplied by a sine function at the frequency of the one of the plurality of transmission bands;
a filter coupled to receive signals from the down-converter, the filter substantially filtering out signals not in the base band;
an analog-to-digital converter coupled to receive signals from the filter and generate digitized signals;
an equalizer coupled to receive the digitized signals, wherein the equalizer is a complex equalizer executing a transfer function, the transfer function having parameters $C_k^x(j)$ and $C_k^y(j)$, where j is an integer; and
a trellis decoder coupled to receive signals from the equalizer and generate recreated data, the recreated data being substantially the same data transmitted by a corresponding transmitter.

19. The system of claim 18, wherein the center parameters $C_k^x(0)$ and $C_k^y(0)$ are fixed.

20. The system of claim 19, wherein $C_k^x(0)$ is one and $C_k^y(0)$ is zero.

21. The system of claim 19, wherein the parameters $C_k^x(-1)$ and $C_k^y(-1)$, are fixed.

22. The system of claim 21, wherein the parameter $C_k^x(-1)$ is about −0.3125.

23. The system of claim 21, wherein the parameter $C_k^y(-1)$ is about −0.015625.

* * * * *